US011617097B2

(12) United States Patent
Kim et al.

(10) Patent No.: US 11,617,097 B2
(45) Date of Patent: Mar. 28, 2023

(54) METHOD FOR PERFORMING MEASUREMENT BY USING RSS IN WIRELESS COMMUNICATION SYSTEM AND APPARATUS THEREFOR

(71) Applicant: LG ELECTRONICS INC., Seoul (KR)

(72) Inventors: Jaehyung Kim, Seoul (KR); Changhwan Park, Seoul (KR); Joonkui Ahn, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 17/265,975

(22) PCT Filed: Aug. 8, 2019

(86) PCT No.: PCT/KR2019/009988
§ 371 (c)(1),
(2) Date: Feb. 4, 2021

(87) PCT Pub. No.: WO2020/032630
PCT Pub. Date: Feb. 13, 2020

(65) Prior Publication Data

US 2021/0306888 A1 Sep. 30, 2021

Related U.S. Application Data

(60) Provisional application No. 62/716,973, filed on Aug. 9, 2018.

(30) Foreign Application Priority Data

Sep. 25, 2018 (KR) ........................ 10-2018-0114549
Mar. 29, 2019 (KR) ........................ 10-2019-0037405
May 3, 2019 (KR) ........................ 10-2019-0052622

(51) Int. Cl.
*H04W 24/08* (2009.01)
*H04W 56/00* (2009.01)

(52) U.S. Cl.
CPC ......... *H04W 24/08* (2013.01); *H04W 56/001* (2013.01)

(58) Field of Classification Search
None
See application file for complete search history.

(56) References Cited

U.S. PATENT DOCUMENTS

2016/0174126 A1 6/2016 Bontu et al.
2017/0237542 A1* 8/2017 Harrison ............. H04W 52/241 370/329

(Continued)

FOREIGN PATENT DOCUMENTS

KR 1020170034341 3/2017

OTHER PUBLICATIONS

"3GPP TSG RAN Meeting #80 RP-181186", La Jolla, US, Jun. 11-14, 2018, pp. 1-7 (Year: 2018).*

(Continued)

*Primary Examiner* — Saad Khawar
(74) *Attorney, Agent, or Firm* — Lee Hong Degerman Kang Waimey

(57) ABSTRACT

The present specification provides a method for performing measurement by using an RSS in a wireless communication system. More specifically, the method performed by a terminal comprises the steps of: receiving, from a first base station, power boosting information indicating a relative value compared to cell-specific reference signal (CRS) power and CRS port information indicating the number of CRS antenna ports; receiving the RSS from the first base station; and measuring the reference signal received power (RSRP) and/or the reference signal received quality (RSRQ)

(Continued)

of the RSS on the basis of the power boosting information and the CRS port information.

20 Claims, 18 Drawing Sheets

(56) References Cited

U.S. PATENT DOCUMENTS

2017/0311215 A1 10/2017 Huang et al.
2019/0306812 A1* 10/2019 Sengupta ............ H04W 56/005

OTHER PUBLICATIONS

PCT International Application No. PCT/KR2019/009988, International Search Report dated Dec. 4, 2019, 4 pages.
Ericsson, "New WID on Rel-16 MTC enhancements for LTE", RP-181450, 3GPP TSG RAN Meeting #80, Jun. 2018, 4 pages.
ZTE, "Remaining issues on resynchronization signal for MTC", R1-1806185, 3GPP TSG RAN WG1 Meeting #93, May 2018, 4 pages.
LG Electronics, "Discussion on the use of RSS for measurement improvement", R1-1810239. 3GPP TSG RAN WG1 Meeting #94bis, Oct. 2018, 8 pages.

* cited by examiner

【FIG. 1】
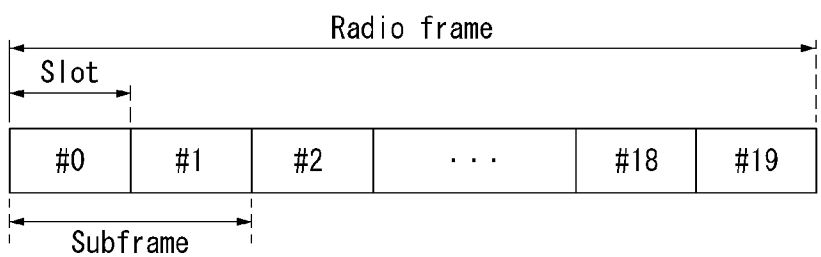

【FIG. 2】
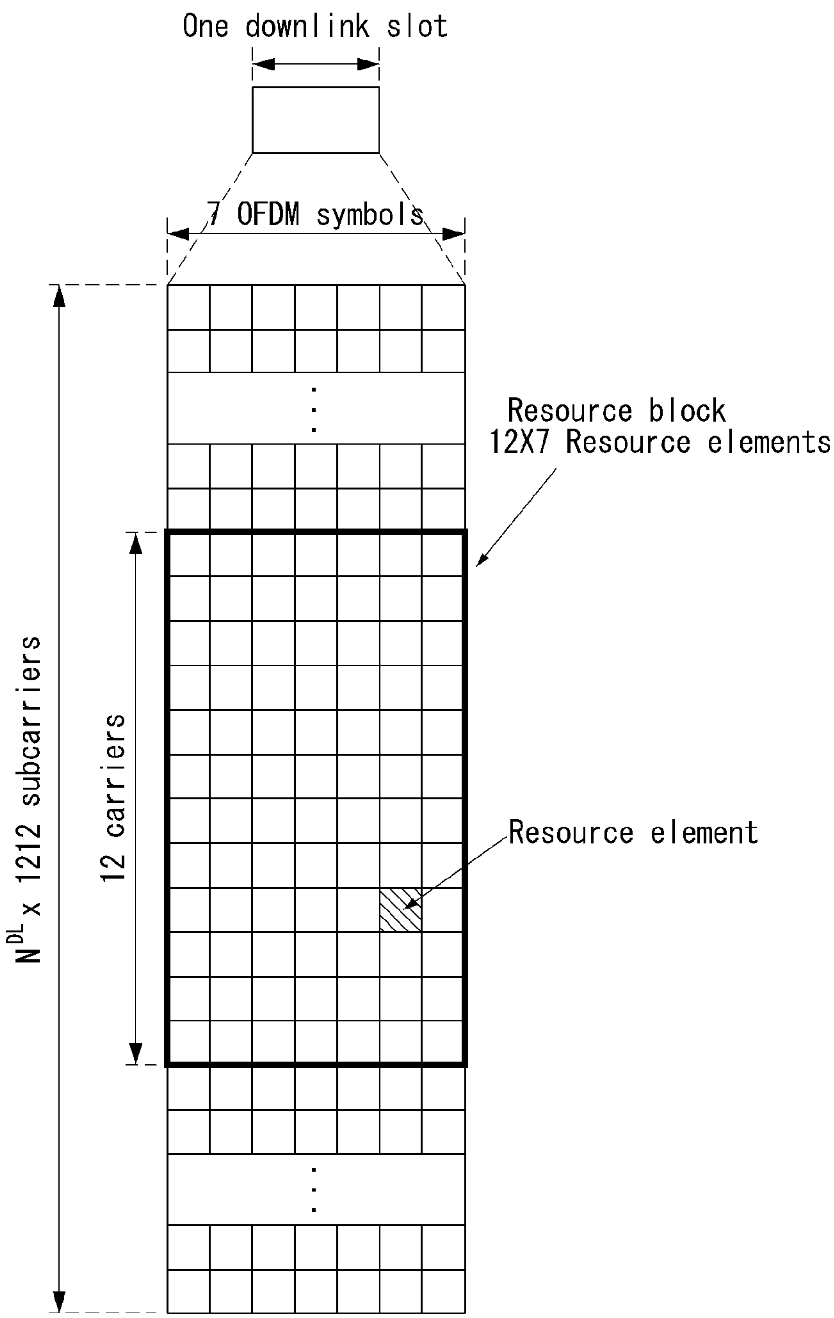

【FIG. 3】
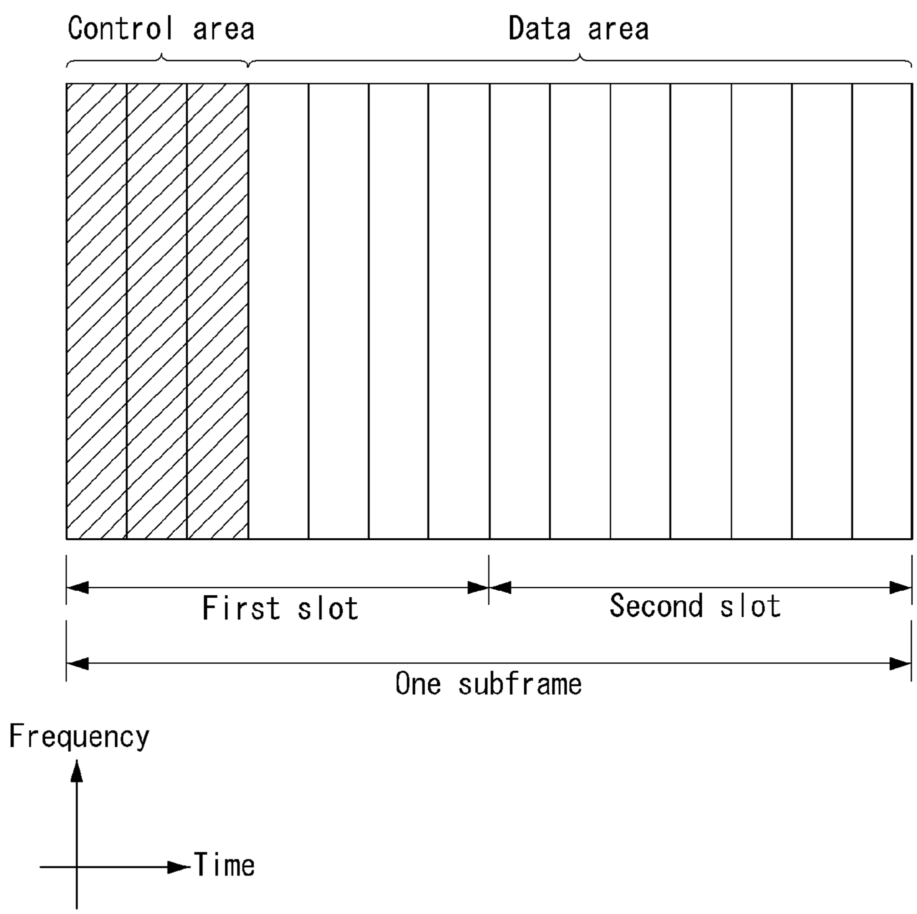

【FIG. 4】
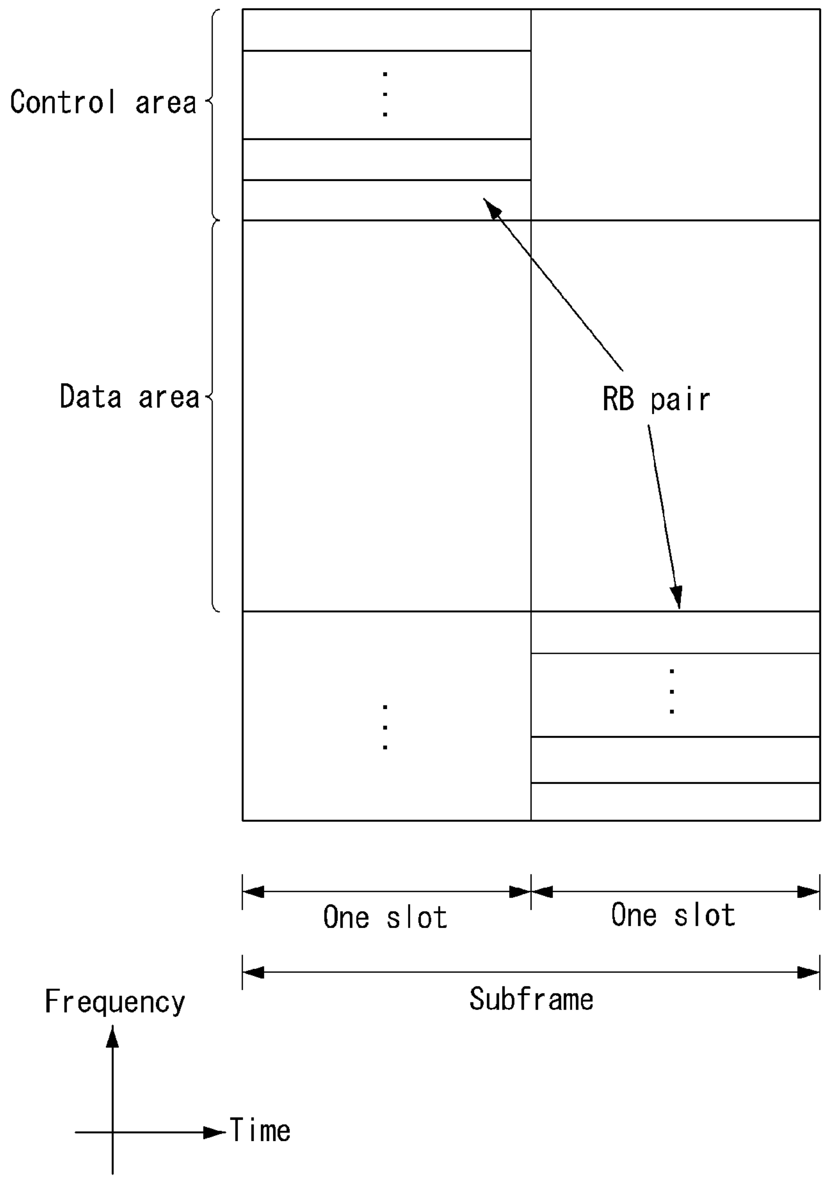

【FIG. 5】
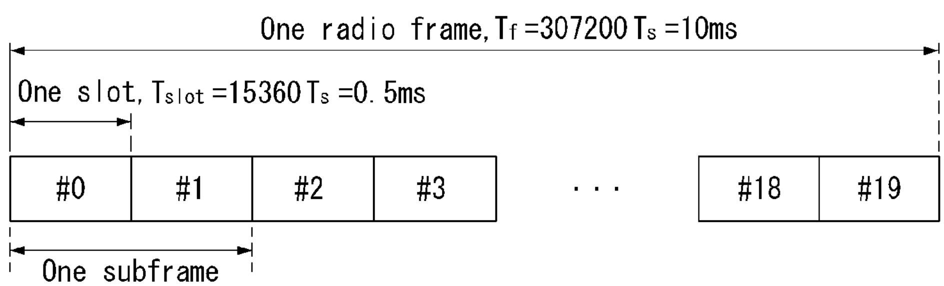

[FIG. 6]
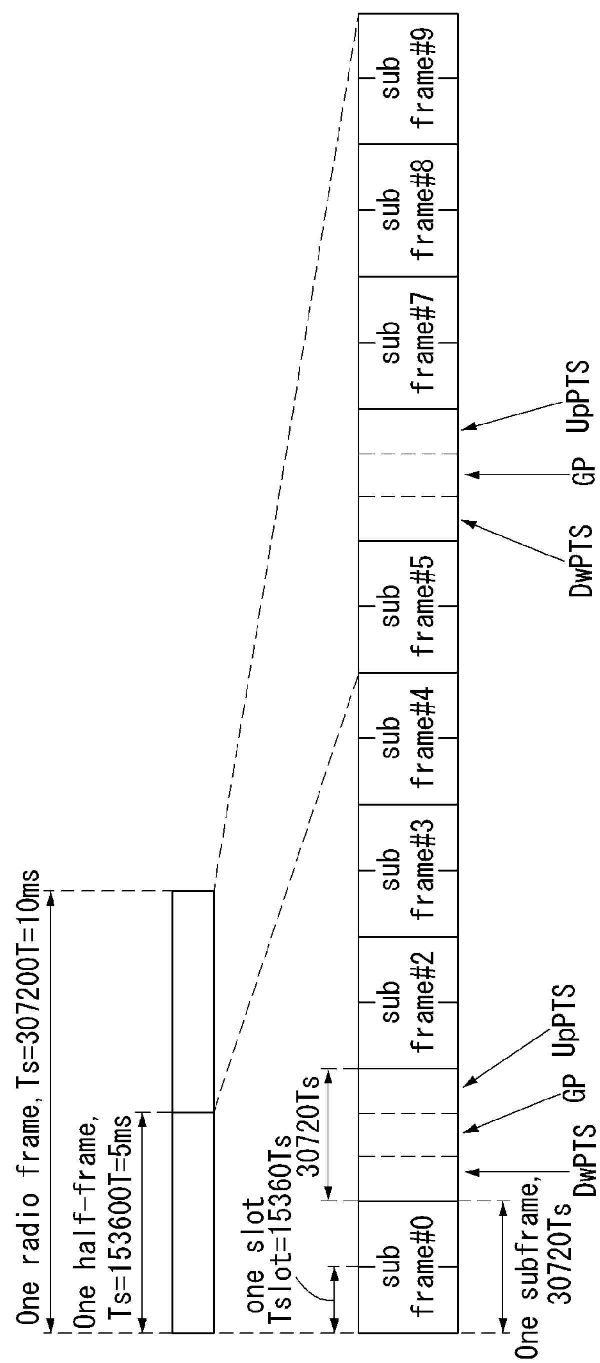

【FIG. 7】
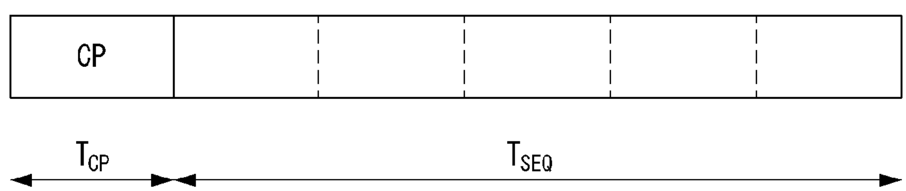

【FIG. 8】
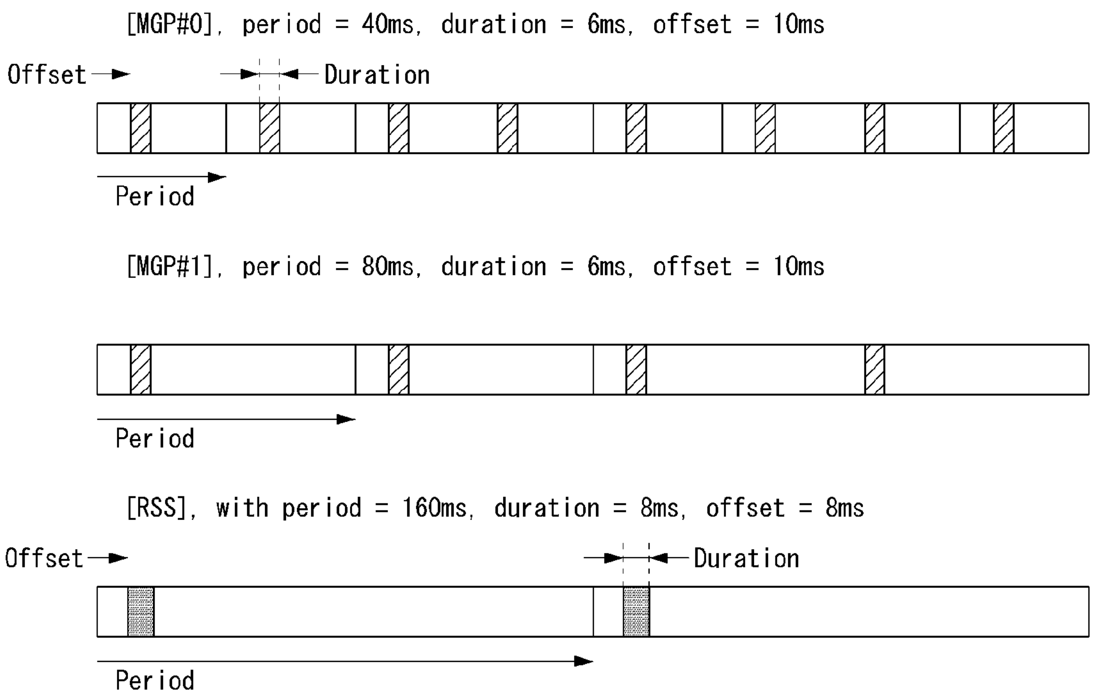

【FIG. 9】
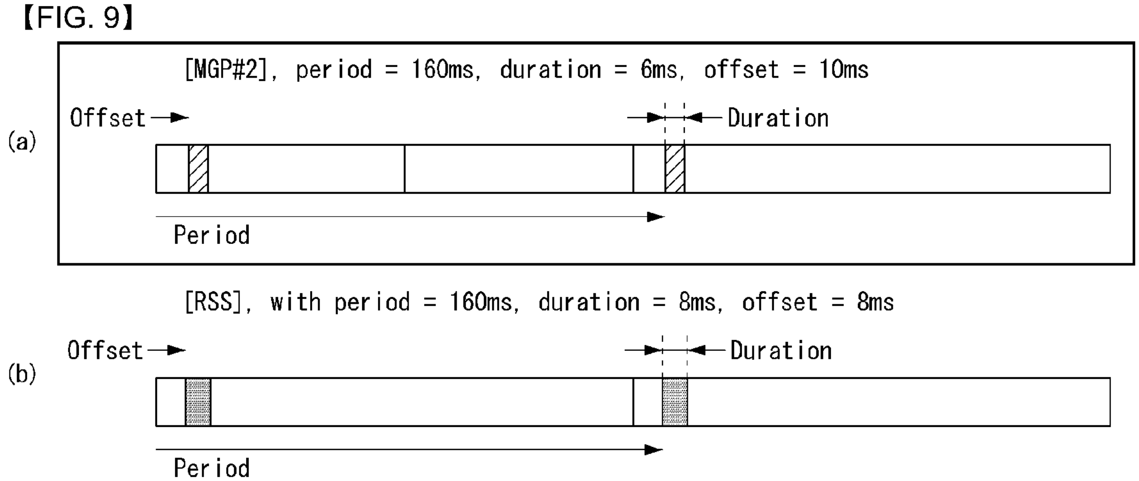

【FIG. 10】
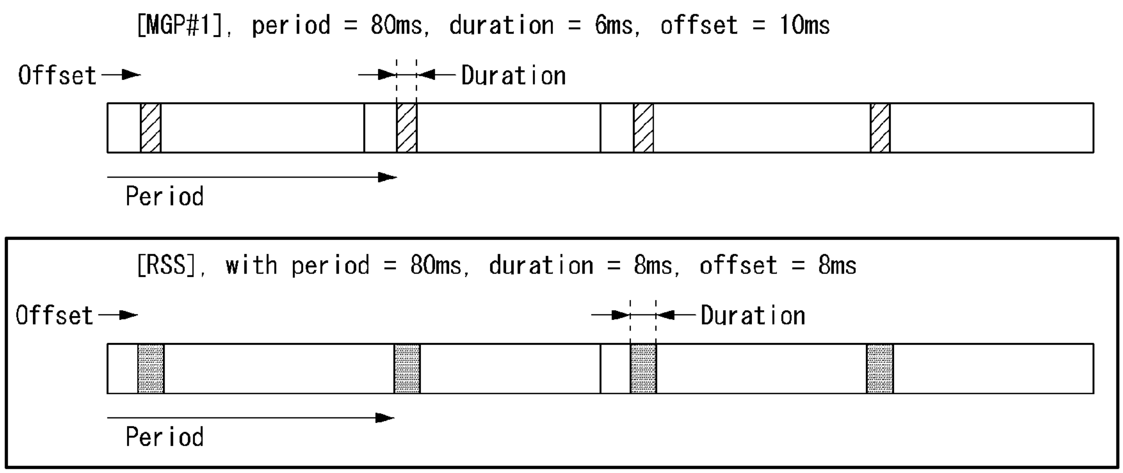

【FIG. 11】
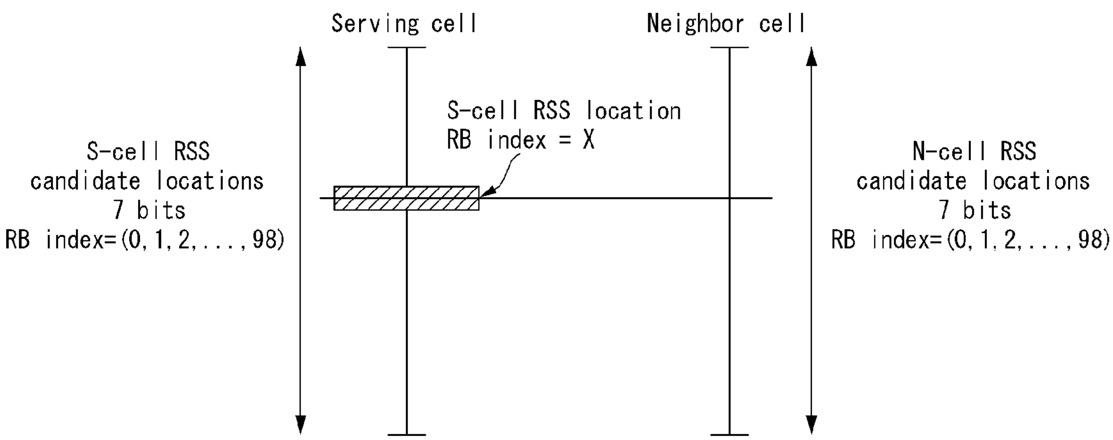

【FIG. 12】
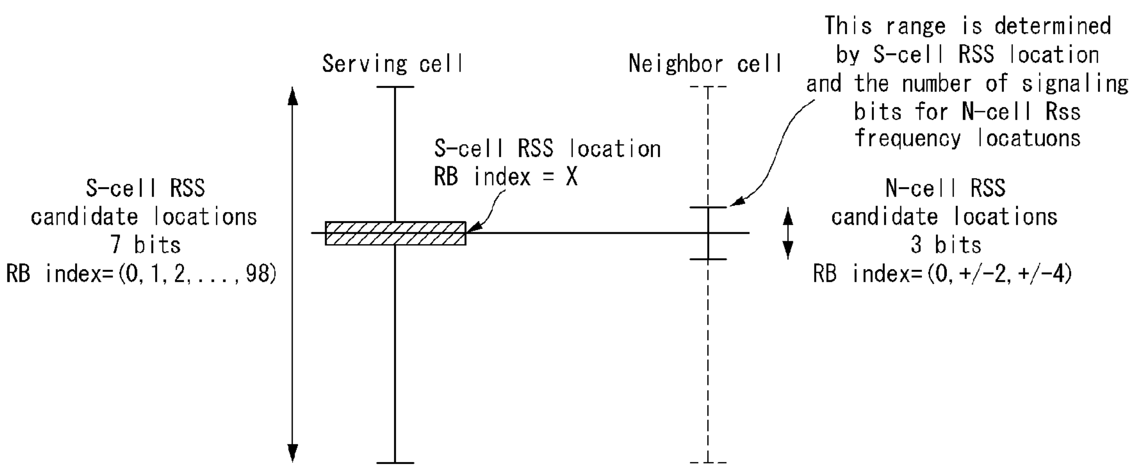

【FIG. 13】
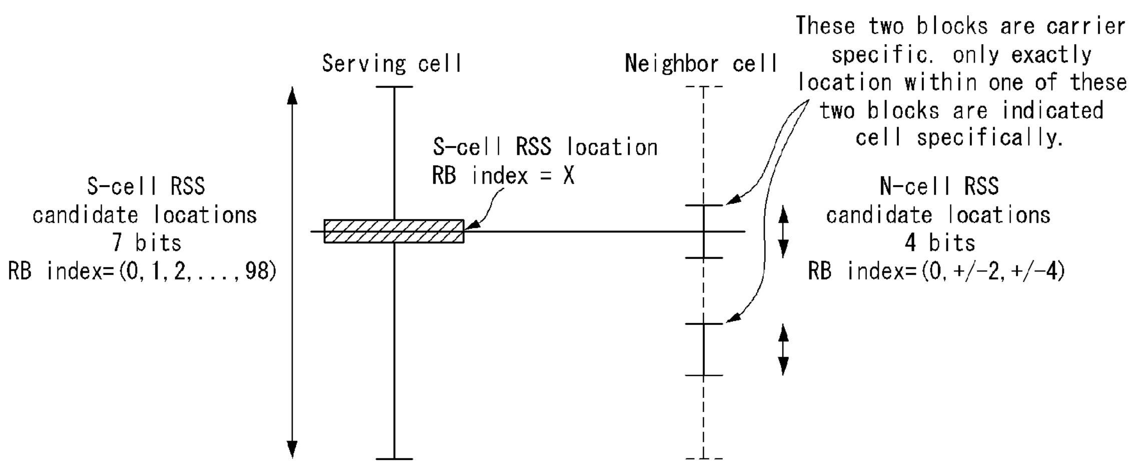

【FIG. 14】
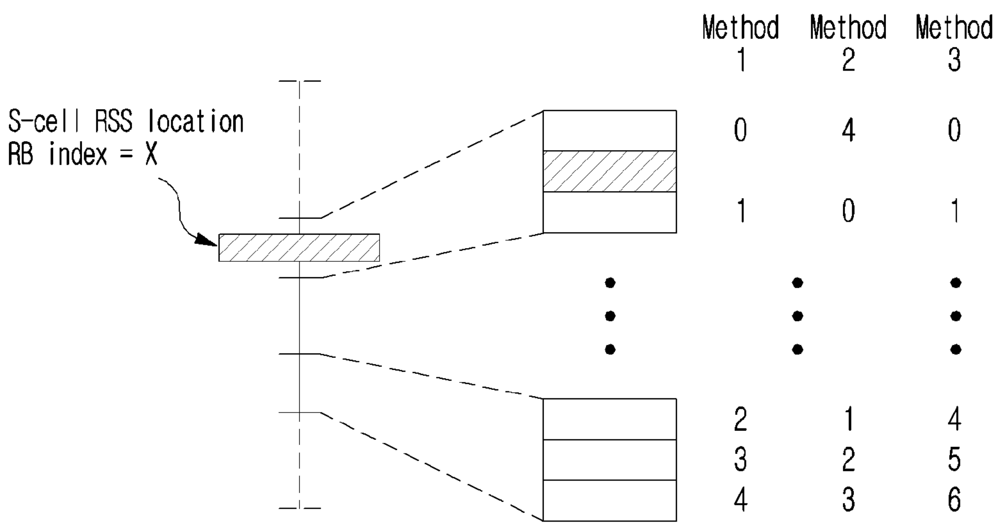

【FIG. 15】
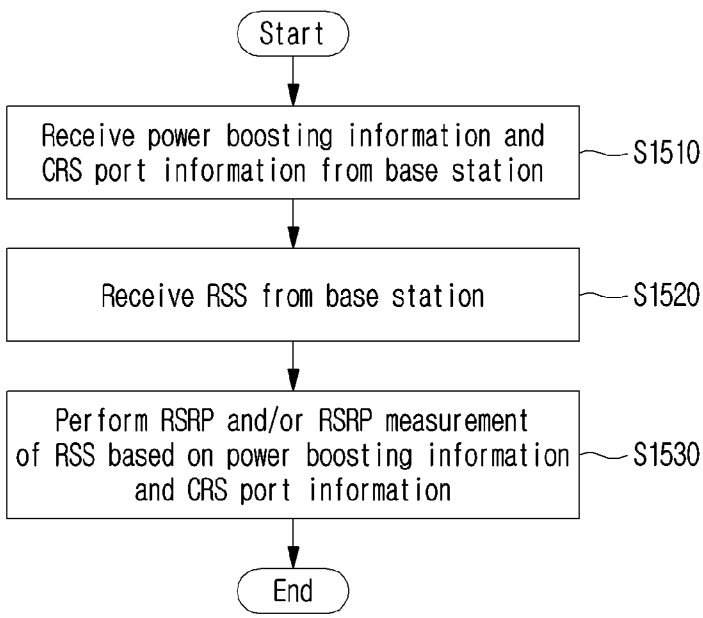

【FIG. 16】
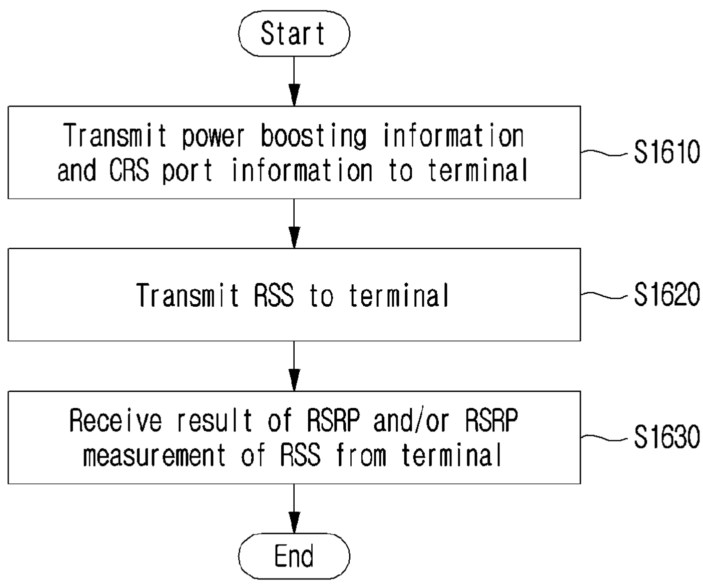

【FIG. 17】
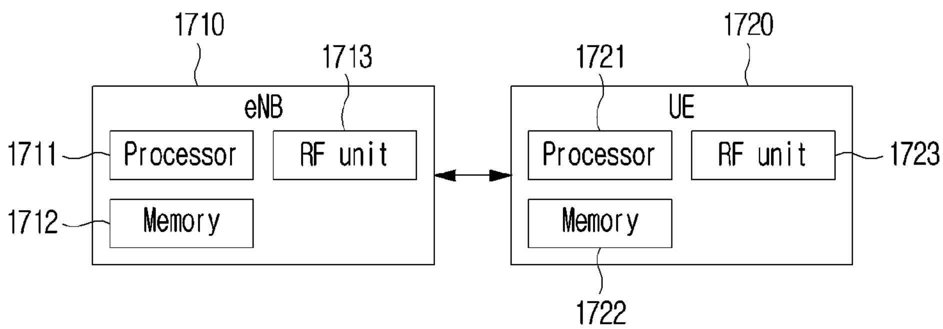

[FIG. 18]
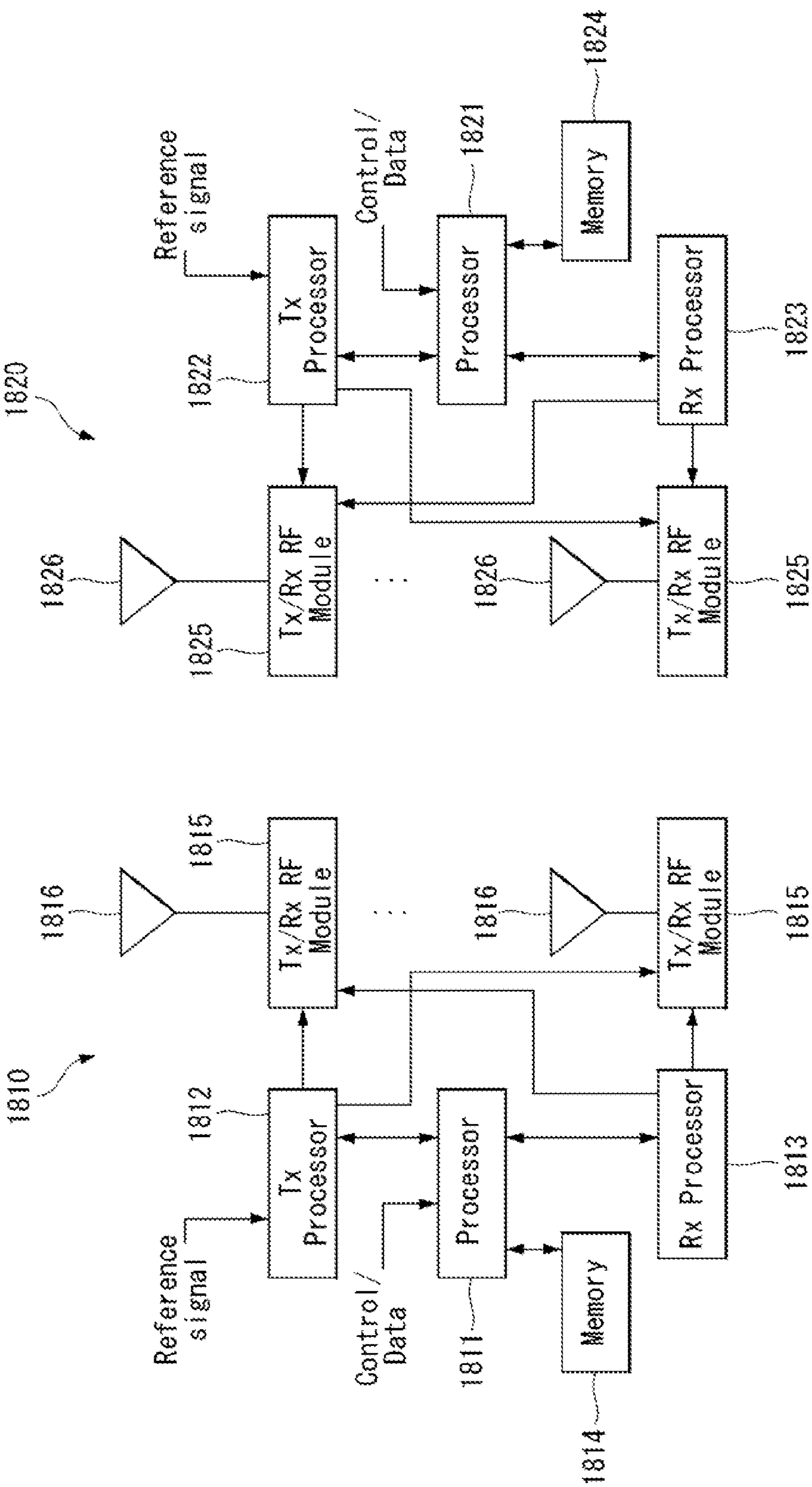

METHOD FOR PERFORMING MEASUREMENT BY USING RSS IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/009988, filed on Aug. 8, 2019, which claims the benefit of earlier filing date and right of priority to Korean Application Nos. 10-2018-0114549, filed on Sep. 25, 2018, 10-2019-0037405, filed on Mar. 29, 2019, 10-2019-0052622, filed on May 3, 2019 and also claims the benefit of U.S. Provisional Application No. 62/716,973, filed on Aug. 9, 2018, the contents of which are all hereby incorporated by reference herein in their entirety.

TECHNICAL FIELD

The present disclosure relates to a wireless communication system, and more particularly, to a method of performing measurement using an RSS and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method for improving RSRP and/or RSRQ measurement performance of LTE MTC.

In addition, an object of the present disclosure is to provide a method of performing measurement using an RSS by using power boosting information of the RSS and CRS port information.

The technical objects to attain in the present disclosure are not limited to the above-described technical objects and other technical objects which are not described herein will become apparent to those skilled in the art from the following description.

Technical Solution

In the present disclosure, a method of performing measurement using a Resynchronization Signal (RSS) in a wireless communication system, the method performed by a terminal includes receiving power boosting information representing a value relative to cell-specific reference signal (CRS) power and CRS port information representing a number of antenna ports of a CRS from a first base station; receiving the RSS from the first base station; and performing Reference Signal Received Power (RSRP) and/or Reference Signal Received Quality (RSRQ) measurement of the RSS based on the power boosting information and the CRS port information.

In addition, in the present disclosure, the number of antenna ports of the CRS is 1, 2 or 4.

In addition, in the present disclosure, an antenna port of the RSS is determined based on the antenna port of the CRS.

In addition, in the present disclosure, the method further includes receiving, from the first base station, control information on a location of time and/or frequency of RSS transmitted from a second base station.

In addition, in the present disclosure, the control information represents a relative value to a location of time and/or frequency of the RSS transmitted from the first base station.

In addition, in the present disclosure, the first base station is a serving cell, and the second base station is a neighbor cell.

In addition, in the present disclosure, a terminal for performing measurement using a Resynchronization Signal (RSS) in a wireless communication system, the terminal includes a transmitter for transmitting a radio signal; a receiver for receiving a radio signal; and a processor for controlling the transmitter and the receiver, wherein the processor controls to: receive power boosting information representing a value relative to cell-specific reference signal (CRS) power and CRS port information representing a number of antenna ports of a CRS from a first base station; receive the RSS from the first base station; and perform Reference Signal Received Power (RSRP) and/or Reference Signal Received Quality (RSRQ) measurement of the RSS based on the power boosting information and the CRS port information.

Technical Effects

The present disclosure has an effect of improving the RSRP and/or RSRQ measurement performance of LTE MTC by performing measurement using not only the CRS but also the RSS.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 is a diagram illustrating an example of the structure of a radio frame of LTE.

FIG. 2 is a diagram illustrating an example of a resource grid for downlink slot.

FIG. 3 illustrates an example of the structure of downlink subframe.

FIG. 4 illustrates an example of the structure of uplink subframe.

FIG. 5 illustrates an example of the frame structure type 1.

FIG. 6 is a diagram illustrating another example of the frame structure type 2.

FIG. 7 illustrates an example of the random access symbol group.

FIG. 8 is a diagram illustrating an example of a method for configuring a measurement interval pattern and an RSS.

FIG. 9 illustrates an example of an MGP configuration method proposed in the present disclosure.

FIG. 10 illustrates another example of an MGP configuration method proposed in the present disclosure.

FIG. 11 is a diagram illustrating an example of a signaling method of an RSS frequency location of a neighbor cell without delta signaling proposed in the present disclosure.

FIG. 12 is a diagram illustrating an example of a signaling method of an RSS frequency location of a neighbor cell with delta signaling proposed in the present disclosure.

FIG. 13 illustrates an example of a signaling method of an RSS frequency location of a neighbor cell with delta signaling proposed in the present disclosure.

FIG. 14 illustrates an example of a signaling method of an RSS frequency location of a neighbor set having two blocks proposed in the present disclosure.

FIG. 15 is a flowchart illustrating an operation method of a terminal for performing measurement using an RSS proposed in the present disclosure.

FIG. 16 is a flowchart illustrating an operation method of a base station for performing measurement using an RSS proposed in the present disclosure.

FIG. 17 illustrates a block diagram of a radio communication device to which methods suggested in the present disclosure may be applied.

FIG. 18 is another example of a block diagram of a radio communication device to which methods suggested in the present disclosure may be applied.

BEST MODE FOR INVENTION

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System

FIG. 1 is a diagram illustrating an example of the structure of a radio frame of LTE.

In FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 2 is a diagram illustrating an example of a resource grid for downlink slot.

In FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 3 illustrates an example of the structure of downlink subframe.

In FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 4 illustrates an example of the structure of uplink subframe.

In FIG. 4, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s$=1/(15000×2048) seconds.

Downlink and uplink transmissions are organized into radio frames with $T_f$=307200×$T_s$=10 ms duration. Two radio frame structures are supported:

Type 1, applicable to FDD

Type 2, applicable to TDD

Frame Structure Type 1

Frame structure type 1 is applicable to both full duplex and half duplex FDD. Each radio frame is $T_f$=307200–$T_s$=10 ms long and consists of 20 slots of length $T_{slot}$=15360–$T_s$=0.5 ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

FIG. 5 illustrates an example of the frame structure type 1.

Frame Structure Type 2

Frame structure type 2 is applicable to FDD. Each radio frame of length $T_f$=307200×$T_s$=10 ms consists of two half-frames of length 15360–$T_s$=0.5 ms each. Each half-frame consists of five subframes of length 30720–$T_s$=1 ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to 30720 $T_s$=1 ms. Each subframe i is defined as two slots, 2i and 2i+1 of length $T_{slot}$=15360·$T_s$=0.5 ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

FIG. 6 is a diagram illustrating another example of the frame structure type 2.

Table 1 shows an example of a configuration of a special subframe.

TABLE 1

| Special subframe configuration | normal cyclic prefix in downlink | | | extended cyclic prefix in downlink | | |
|---|---|---|---|---|---|---|
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $2560 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

NB-IoT

NB-IoT (narrowband-internet of things) is a standard for supporting low complexity and low cost devices and is defined to perform only relatively simple operations compared to existing LTE devices. NB-IoT follows the basic structure of LTE, but operates based on the contents defined below. If the NB-IoT reuses an LTE channel or signal, it may follow the standard defined in the existing LTE.

Uplink

The following narrowband physical channels are defined:

NPUSCH (Narrowband Physical Uplink Shared Channel)

NPRACH (Narrowband Physical Random Access Channel)

The following uplink narrowband physical signals are defined:

Narrowband demodulation reference signal

The uplink bandwidth in terms of subcarriers $N_{sc}^{UL}$, and the slot duration $T_{slot}$ are given in Table 3.

Table 3 shows an example of NB-IoT parameters.

TABLE 3

| Subcarrier spacing | $N_{sc}^{UL}$ | $T_{slot}$ |
|---|---|---|
| $\Delta f = 3.75$ kHz | 48 | $61440 \cdot T_s$ |
| $\Delta f = 15$ kHz | 12 | $15360 \cdot T_s$ |

A single antenna port p=0 is used for all uplink transmissions.

Resource Unit

Resource units are used to describe the mapping of the $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $N_{sc}^{RU}$, $N_{slots}^{UL}$ and $N_{symb}^{UL}$.

TABLE 4

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{ini}=n_{RNTI} \cdot 2^{14}+n_f \bmod 2 \cdot 2^{13}+\lfloor n_s/2 \rfloor+N_{ID}^{Ncell}$ where $n_s$ is the first slot of the transmission of the codeword. In case of NPUSCH repetitions, the scrambling sequence shall be reinitialized according to the above formula after every $M_{identical}^{NPUSCH}$ transmission of the codeword with $n_s$ and $n_f$ set to the first slot and the frame, respectively, used for the transmission of the repetition. The quantity $M_{identical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
| | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols z(0), . . . , z($M_{rep}^{NPUSCH}$−1) shall be multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k,l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{identical}^{NPUSCH}$−1 additional times, before continuing the mapping of z(•) to the following slot, where Equation 1, $$M_{idendical}^{NPUSCH} = \begin{cases} \text{in}(\lceil M_{rep}^{NPUSCH}/2 \rceil, 4) & N_{sc}^{RU} > 1 \\ 1 & N_{sc}^{RU} = 1 \end{cases} \quad \text{[Equation 1]}$$

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of z(0), . . . , z($M_{rep}^{NPUSCH}$−1) is then repeated until $M_{rep}^{NPUSCH} N_{RU} N_{slots}^{UL}$ slots have been transmitted. After transmissions and/or postponements due to NPRACH of 256·30720 $T_s$ time units, a gap of 40·30720 $T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgement $o_0^{ACK}$=1 and for a negative acknowledgement $o_0^{ACK}$=0.

Table 6 shows an example of HARQ-ACK code words.

TABLE 6

| HARQ-ACK $\langle o_0^{ACK} \rangle$ | HARQ-ACK $\langle b_0, b_1, b_2, \ldots, b_{15} \rangle$ |
|---|---|
| 0 | $\langle 0, 0, 0, 0, 0, 0, 0, 0, 0, 0, 0, 0, 0, 0, 0, 0 \rangle$ |
| 1 | $\langle 1, 1, 1, 1, 1, 1, 1, 1, 1, 1, 1, 1, 1, 1, 1, 1 \rangle$ |

Power Control

The UE transmit power for NPUSCH transmission in NB-IoT UL slot i for the serving cell is given by Equation 2 and 3 below.

If the number of repetitions of the allocated NPUSCH RUs is greater than 2, $$P_{NPUSCH,c}(i) = P_{CMAX,c}(i) \text{ [dBm]} \quad \text{[Equation 2]}$$

Otherwise,

[Equation 3]

$$P_{NPUSCH,c}(i) = \min\left\{ \begin{matrix} P_{CMAX,c}(i), \\ 10\log_{10}(M_{NPUSCH,c}(i)) + P_{O\_NPUSCH,c}(j) + \alpha_c(j) \cdot PL_c \end{matrix} \right\} \text{ [dBm]}$$

where, $P_{CMAX,c}(i)$ is the configured UE transmit power defined in 3GPP TS36.101 in NB-IoT UL slot i for serving cell c.

$M_{NPUSCH,c}$ is {¼} for 3.75 kHz subcarrier spacing and {1, 3, 6, 12} for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1,2}. For NPUSCH (re)transmissions corresponding to a dynamic scheduled grant then j=1 and for NPUSCH (re)transmissions corresponding to the random access response grant then j=2.

$P_{O\_NPUSCH,c}(2)$=0 and $P_{O\_NOMINAL\_NPUSCH,c}(2) = P_{O\_RE} + \Delta_{PREAMBLE\_Msg3}$, where the parameter preambleInitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)$=1; for NPUSCH format 1, $\alpha_c(j)$ is provided by higher layers for serving cell c. For j=2, $\alpha_c(j)$=1.

$PL_c$ is the downlink path loss estimate calculated in the UE for serving cell c in dB and $PL_c$=nrs-Power+nrs-PowerOffsetNonAnchor−higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4 below.

$$PH_c(i) = P_{CMAX,c}(i) - \{P_{O\_NPUSCH,c}(l) + \alpha_c(l) \cdot PL_c\} \text{[dB]} \quad \text{[Equation 4]}$$

UE Procedure for Transmitting Format 1 NPUSCH

A UE shall upon detection on a given serving cell of a NPDCCH with DCI format N0 ending in NB-IoT DL subframe n intended for the UE, perform, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe $n+k_0$ value of $k_0$ is determined by the scheduling delay field ($I_{Delay}$) in the corresponding DCI according to Table 7.

Table 7 shows an example of $k_O$ for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE

- a set of contiguously allocated subcarriers ($n_{sc}$) of a resource unit determined by the Subcarrier indication field in the corresponding DCI,
- a number of resource units ($N_{RU}$) determined by the resource assignment field in the corresponding DCI according to Table 9,
- a repetition number ($N_{Rep}$) determined by the repetition number field in the corresponding DCI according to Table 10.

The subcarrier spacing Δf of NPUSCH transmission is determined by the uplink subcarrier spacing field in the Narrowband Random Access Response Grant according to Subclause 16.3.3 in 3GPP TS36.213.

For NPUSCH transmission with subcarrier spacing Δf=3.75 kHz, $n_{sc}=I_{sc}$ where $I_{sc}$ is the subcarrier indication field in the DCI.

For NPUSCH transmission with subcarrier spacing Δf=15 kHz, the subcarrier indication field ($I_{sc}$) in the DCI determines the set of contiguously allocated subcarriers ($n_{sc}$) according to Table 8.

Table 8 shows an example of subcarriers allocated to the NPUSCH having Δf=15 kHz.

TABLE 8

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0,1,2\}$ |
| 16-17 | $6(I_{sc} - 16) + \{0,1,2,3,4,5\}$ |
| 18 | {0,1,2,3,4,5,6,7,8,9,10,11} |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5 below.

[Equation 5]

$$\bar{r}_u(n) = \frac{1}{\sqrt{2}}(1+j)(1-2c(n))w(n \bmod 16),\ 0 \le n < M_{rep}^{NPUSCH} N_{RU} N_{slots}^{UL}$$

where the binary sequence c(n) is defined by clause 7.2 of TS36.211 and shall be initialized with $c_{init}=35$ at the start of the NPUSCH transmission. The quantity w(n) is given by Table 1-11 where $u=N_{ID}^{Ncell} \bmod 16$ for NPUSCH format 2, and for NPUSCH format 1 if group hopping is not enabled, and by clause 10.1.4.1.3 of 3GPP TS36.211 if group hopping is enabled for NPUSCH format 1.

Table 11 shows an example of w(n).

TABLE 11

| u | w(0), . . . , w(15) | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 | −1 | −1 |
| 3 | 1 | −1 | −1 | 1 | 1 | −1 | −1 | 1 | 1 | −1 | −1 | 1 | 1 | −1 | −1 | 1 |
| 4 | 1 | 1 | 1 | 1 | −1 | −1 | −1 | −1 | 1 | 1 | 1 | 1 | −1 | −1 | −1 | −1 |
| 5 | 1 | −1 | 1 | −1 | −1 | 1 | −1 | 1 | 1 | −1 | 1 | −1 | −1 | 1 | −1 | 1 |

TABLE 11-continued

| u | w(0), . . . , w(15) | | | | | | | | | | | | | | | |
|---|---|---|---|---|---|---|---|---|---|---|---|---|---|---|---|---|
| 6 | 1 | 1 | −1 | −1 | −1 | −1 | 1 | 1 | 1 | 1 | −1 | −1 | −1 | −1 | 1 | 1 |
| 7 | 1 | −1 | −1 | 1 | −1 | 1 | 1 | −1 | 1 | −1 | −1 | 1 | −1 | 1 | 1 | −1 |
| 8 | 1 | 1 | 1 | 1 | 1 | 1 | 1 | 1 | −1 | −1 | −1 | −1 | −1 | −1 | −1 | −1 |
| 9 | 1 | −1 | 1 | −1 | 1 | −1 | 1 | −1 | −1 | 1 | −1 | 1 | −1 | 1 | −1 | 1 |
| 10 | 1 | 1 | −1 | −1 | 1 | 1 | −1 | −1 | −1 | −1 | 1 | 1 | −1 | −1 | 1 | 1 |
| 11 | 1 | −1 | −1 | 1 | 1 | −1 | −1 | 1 | −1 | 1 | 1 | −1 | −1 | 1 | 1 | −1 |
| 12 | 1 | 1 | 1 | 1 | −1 | −1 | −1 | −1 | −1 | −1 | −1 | −1 | 1 | 1 | 1 | 1 |
| 13 | 1 | −1 | 1 | −1 | −1 | 1 | −1 | 1 | −1 | 1 | −1 | 1 | 1 | −1 | 1 | −1 |
| 14 | 1 | 1 | −1 | −1 | −1 | −1 | 1 | 1 | −1 | −1 | 1 | 1 | 1 | 1 | −1 | −1 |
| 15 | 1 | −1 | −1 | 1 | −1 | 1 | 1 | −1 | −1 | 1 | 1 | −1 | 1 | −1 | −1 | 1 |

The reference signal sequence for NPUSCH format 1 is given by Equation 6 below.

$$r_u(n)=\bar{r}_u(n) \qquad \text{[Equation 6]}$$

The reference signal sequence for NPUSCH format 2 is given by Equation 7 below.

$$r_u(3n+m)=\overline{w}(m)\bar{r}_u(n), m=0,1,2 \qquad \text{[Equation 7]}$$

where $\overline{w}(m)$ is defined in Table 5.5.2.2.1-2 of 3GPP TS36.211 with the sequence index chosen according to $$\left(\sum_{i=0}^{7} c(8n_s+i)2^i\right) \bmod 3$$

with $c_{init}=N_{ID}^{Ncell}$.

The reference signal sequences $r_u(n)$ for $N_{sc}^{RU}>1$ is defined by a cyclic shift α of a base sequence according to Equation 8 below.

$$r_u(n)=e^{j\alpha n}e^{j\phi(n)\pi/4}, 0 \le n < N_{sc}^{RU} \qquad \text{[Equation 8]}$$

where φ(n) is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index U is given by higher layer parameters threeTone-BaseSequence, sixTone-BaseSequence, and twelveTone-BaseSequence for $N_{sc}^{RU}=3$, $N_{sc}^{RU}=6$, $N_{sc}^{RU}=12$, respectively. If not signalled by higher layers, the base sequence is given by Equation 9 below.

$$u=\begin{cases} N_{ID}^{Ncell} \bmod 12 & \text{for } N_{sc}^{RU}=3 \\ N_{ID}^{Ncell} \bmod 14 & \text{for } N_{sc}^{RU}=6 \\ N_{ID}^{Ncell} \bmod 30 & \text{for } N_{sc}^{RU}=12 \end{cases} \qquad \text{[Equation 9]}$$

If group hopping is enabled, the base sequence index u is given by clause 10.1.4.1.3 of 3GPP TS36.211.

The cyclic shift α for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, α=0.

Table 12 shows an example of φ(n) for $N_{sc}^{RU}=3$

TABLE 12

| u | φ(0),φ(1),φ(2) | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |

TABLE 12-continued

| u | φ(0),φ(1),φ(2) | | |
|---|---|---|---|
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 shows another example of φ(n) for $N_{sc}^{RU}=6$

TABLE 13

| u | φ(0), . . . , φ(5) | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 shows an example of α

TABLE 14

| $N_{sc}^{RU}=3$ | | $N_{sc}^{RU}=6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
| | | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10 below.

$$u=(f_{gh}(n_s)+f_{ss}) \bmod N_{seq}^{RU} \qquad \text{[Equation 10]}$$

where the number of reference signal sequences available for each resource unit size, $N_{seq}^{RU}$ is given by Table 15.

Table 15 shows an example of $N_{seq}^{RU}$

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11 below.

[Equation 11]

$$f_{gh}(n_s) = \left(\sum_{i=0}^{7} c(8n_s' + i)\cdot 2^i\right) \mathrm{mod} N_{seq}^{RU}$$

where $n_s'=n_s$ for $N_{sc}^{RU}>1$ and $n_s'$ is the slot number of the first slot of the resource unit for $N_{sc}^{RU}=1$. The pseudo-random sequence c(i) is defined by clause 7.2. The pseudo-random sequence generator shall be initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by Equation 12 below.

$$f_{ss}=(N_{ID}^{Ncell}+\Delta_{ss}) \bmod N_{seq}^{RU} \quad \text{[Equation 12]}$$

where $\Delta_{ss}\in\{0, 1, \ldots, 29\}$ is given by higher-layer parameter groupAssignmentNPUSCH. If no value is signalled, $\Delta_{ss}=0$.

The sequence r(•) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k,l) shall be in increasing order of first k, then l, and finally the slot number. The values of the symbol index l in a slot are given in Table 16.

Table 16 shows an example of demodulation reference signal location for NPUSCH

TABLE 16

| NPUSCH format | Values for l | |
|---|---|---|
| | Δf = 3.75 kHz | Δf = 15 kHz |
| 1 | 4 | 3 |
| 2 | 0,1,2 | 2,3,4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 13 below $$s_{k,l}(t)=a_{k^{(-)},l}\cdot e^{j\phi_{k,l}}\cdot e^{j2\pi(k+1/2)\Delta f(t-N_{CP,l}T_s)}$$

$$k^{(-)}=k+\lfloor N_{sc}^{UL}/2\rfloor \quad \text{[Equation 13]}$$

For $0\le t<(N_{CP,l}+N)T_s$ where parameters for Δf=15 kHz and Δf=3.75 kHz are given in Table 17, $a_{k^{(-)},l}$ is the modulation value of symbol l and the phase rotation $\varphi_{k,l}$ is defined by Equation 14 below.

$$\varphi_{k,l} = \rho(\tilde{l} \bmod 2) + \hat{\varphi}_k(\tilde{l}) \quad \text{[Equation 14]}$$

$$\rho = \begin{cases} \frac{\pi}{2} & \text{for } BPSK \\ \frac{\pi}{4} & \text{for } QPSK \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N+N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 shows an example of SC-FDMA parameters for $N_{sc}^{RU}=1$.

TABLE 17

| Parameter | Δf = 3.75 kHz | Δf = 15 kHz |
|---|---|---|
| N | 8192 | 2048 |
| Cyclic prefix length $N_{CP,l}$ | 256 | 160 for l = 0<br>144 for l = 1, 2, . . . , 6 |
| Set of values for k | −24, −23, . . . , 23 | −6, −5, . . . , 5 |

The SC-FDMA symbols in a slot shall be transmitted in increasing order of l, starting with l=0, where SC-FDMA symbol l>0 starts at time $$\sum_{l'=0}^{l-1} (N_{CP,l'} + N)T_s$$

within the slot. For Δf=3.75 kHz the remaining $2304T_s$ in $T_{slot}$ are not transmitted and used for guard period.

Narrowband Physical Random Access Channel (NPRACH)

The physical layer random access preamble is based on single-subcarrier frequency-hopping symbol groups. A symbol group is illustrated in FIG. 1-8 Random access symbol group, consisting of a cyclic prefix of length $T_{CP}$ and a sequence of 5 identical symbols with total length $T_{SEQ}$. The parameter values are listed in Table 18.

FIG. 7 illustrates an example of the random access symbol group.

Table 18 shows an example of Random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

A NPRACH configuration provided by higher layers contains the following:

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{PRACH}$ (nprach-NumCBRA-StartSubcarriers), number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720T_s$ time units after the start of a radio frame fulfilling $n_f \bmod(N_{period}^{NPRACH}/10)=0$. After transmissions of $4 \cdot 64(T_{CP}+T_{SEQ})$ time units, a gap of $40 \cdot 30720T_s$ time units shall be inserted.

NPRACH configurations where $N_{scoffset}^{NPRACH}+N_{sc}^{NPRACH}>N_{sc}^{UL}$ are invalid.

The NPRACH starting subcarriers allocated to contention based random access are split in two sets of subcarriers, $\{0, 1, \ldots, N_{sc_{cont}}^{NPRACH}N_{MSG3}^{NPRACH}-1\}$ and $\{N_{sc\_cont}^{NPRACH}N_{MSG3}^{NPRACH}, \ldots, N_{sc_{cont}}^{NPRACH}-1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA}\rfloor \cdot N_{sc}^{RA}$ and Equation 15, $$\tilde{n}_{sc}^{RA}(i)=\begin{cases}(\tilde{n}_{sc}^{RA}(0)+f(i/4)\bmod N_{sc}^{RA} & i\bmod 4=0 \text{ and } i>0\\ \tilde{n}_{sc}^{RA}(i-1)+1 & i\bmod 4=1,3 \text{ and } \tilde{n}_{sc}^{RA}(i-1)\bmod 2=0\\ \tilde{n}_{sc}^{RA}(i-1)-1 & i\bmod 4=1,3 \text{ and } \tilde{n}_{sc}^{RA}(i-1)\bmod 2=1\\ \tilde{n}_{sc}^{RA}(i-1)+6 & i\bmod 4=2 \text{ and } \tilde{n}_{sc}^{RA}(i-1)<6\\ \tilde{n}_{sc}^{RA}(i-1)-6 & i\bmod 4=2 \text{ and } \tilde{n}_{sc}^{RA}(i-1)\geq 6\end{cases} \quad \text{[Equation 15]}$$

$$f(t)=\left(f(t-1)+\left(\sum_{n=10t+1}^{10t+9}c(n)2^{n-(10t+1)}\right)\bmod(N_{sc}^{RA}-1)+1\right)\bmod N_{sc}^{RA}$$

$$f(-1)=0$$

where $\tilde{n}_{SC}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence c(n) is given by clause 7.2 of 3GPP TS36.211. The pseudo random sequence generator shall be initialised with $c_{init}=N_{ID}^{Ncell}$.

The time-continuous random access signal $s_l(t)$ for symbol group i is defined by Equation 16 below.

$$s_l(t)=\beta_{NPRACH}e^{j2\pi(n_{SC}^{RA}(i)+Kk_0+1/2)\Delta f_{RA}(t-T_{CP})} \quad \text{[Equation 16]}$$

Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19 below.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:

- NPDSCH (Narrowband Physical Downlink Shared Channel)
- NPBCH (Narrowband Physical Broadcast Channel)
- NPDCCH (Narrowband Physical Downlink Control Channel)

A downlink narrowband physical signal corresponds to a set of resource elements used by the physical layer but does not carry information originating from higher layers. The following downlink physical signals are defined:

- NRS (Narrowband reference signal)
- Narrowband synchronization signal

Narrowband Physical Downlink Shared Channel (NPDSCH)

The scrambling sequence generator shall be initialized with $c_{ini}=n_{RNTI}\cdot 2^{14}+n_f \bmod 2\cdot 2^{13}+\lfloor n_s/2\rfloor+N_{ID}^{Ncell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min ($M_{rep}^{NPDSCH}$, 4) transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots y^{(p)}(M_{symb}^{ap}-1)$ shall be mapped to resource elements (k,l) which meet all of the following criteria in the current subframe:

the subframe is not used for transmission of NPBCH, NPSS, or NSSS, and they are assumed by the UE not to be used for NRS, and they are not overlapping with resource elements used for CRS (if any), and the index l in the first slot in a subframe fulfils $l\geq l_{Datastart}$ where $l_{Datastart}$ is given by clause 16.4.1.4 of 3GPP TS 36.213.

The mapping of $y^{(p)}(0), \ldots y^{(p)}(-1)$ in sequence starting with $y^{(p)}(0)$ to resource elements (k,l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots y^{(p)}(M_{symb}^{ap}-1)$ is then repeated until $M_{rep}^{NPDSCH}N_{SF}$ subframes have been transmitted. For NPDSCH carrying BCCH, the $y^{(p)}(0), \ldots y^{(p)}(M_{symb}^{ap}-1)$ is mapped to $N_{SF}$ subframes in sequence and then repeated until $M_{rep}^{NPDSCH}N_{SF}$ subframes have been transmitted.

The NPDSCH transmission can be configured by higher layers with transmission gaps where the NPSDCH transmission is postponed. There are no gaps in the NPDSCH transmission if $R_{max}<N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f+\lfloor n_s/2\rfloor) \bmod N_{gap,period}=0$ where the gap periodicity, $N_{gap,period}$, is given by the higher layer parameter dl-GapPeriodicity. The gap duration in number of subframes is given by $N_{gap,duration}=N_{gap,coeff}N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE procedure for receiving the NPDSCH

A NB-IoT UE shall assume a subframe as a NB-IoT DL subframe if the UE determines that the subframe does not contain NPSS/NSSS/NPBCH/NB-SIB1 transmission, and for a NB-IoT carrier that a UE receives higher layer parameter operationModeInfo, the subframe is configured as NB-IoT DL subframe after the UE has obtained SystemInformationBlockType1-NB.

for a NB-IoT carrier that DL-CarrierConfigCommon-NB is present, the subframe is configured as NB-IoT DL subframe by the higher layer parameter downlinkBitmapNonAnchor.

For a NB-IoT UE that supports two HARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, . . . , N−1 according to the NPDCCH information, where subframe n is the last subframe in which the NPDCCH is transmitted and is determined from the starting subframe of NPDCCH transmission and the DCI subframe repetition number field in the corresponding DCI;

subframe(s) $n_i$ with i=0, 1, . . . ,N−1 are N consecutive NB-IoT DL subframe(s) excluding subframes used for SI messages where, $n0<n1<\ldots, nN-1$, $N=N_{Rep}N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe$n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{m,ax}$ is according to Subclause 16.6 in 3GPP 36.213 for the corresponding DCI format N1.

Table 20 shows an example of k0 for DCI format N1.

TABLE 20

| $I_{Delay}$ | $R_{max} < 128$ | $R_{max} \geq 128$ |
|---|---|---|
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of k_0 for DCI format N1 with DCI CRC scrambled by G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |

TABLE 21-continued

| $I_{Delay}$ | $k_0$ |
|---|---|
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE Table 22 shows an example of the number of subframes for NPDSCH. A number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the number of repetitions for NPDSCH.

TABLE 23

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of a start radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
| | $N_{ID}^{Ncell}$ mod 4 = 1 | 16 |
| | $N_{ID}^{Ncell}$ mod 4 = 2 | 32 |
| | $N_{ID}^{Ncell}$ mod 4 = 3 | 48 |
| 8 | $N_{ID}^{Ncell}$ mod 2 = 0 | 0 |
| | $N_{ID}^{Ncell}$ mod 2 = 1 | 16 |
| 16 | $N_{ID}^{Ncell}$ mod 2 = 0 | 0 |
| | $N_{ID}^{Ncell}$ mod 2 = 1 | 1 |

The starting OFDM symbol for NPDSCH is given by index $l_{Datastrart}$ in the first slot in a subframe k and is determined as follows if subframe k is a subframe used for receiving SIB1-NB, $l_{DataStrart}$=3 if the value of the higher layer parameter operationModeInfo is set to '00' or '01'

$l_{Datastrart}$=0 otherwise else $l_{Datastrart}$ is given by the higher layer parameter eutraControlRegionSize if the value of the higher layer parameter eutraControlRegionSize is present $l_{Datastrart}$=0 otherwise UE Procedure for Reporting ACK/NACK The UE shall upon detection of a NPDSCH transmission ending in NB-IoT subframe n intended for the UE and for which an ACK/NACK shall be provided, start, at the end of $n+k_0-1$ DL subframe transmission of the NPUSCH carrying ACK/NACK response using NPUSCH format 2 in N consecutive NB-IoT UL slots, where $N=N_{Rep}^{AN}N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

- The transmission time interval (TTI) is 640 ms.
- The size of the BCH transport block is set to 34 bits
- The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211
- The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling $n_f$ mod 64=0.

Modulation should be done using QPSK modulation scheme for each antenna port is transmitted in subframe 0 during 64 consecutive radio frames starting in each radio frame fulfilling $n_f$ mod 64=0 and shall Layer mapping and precoding shall be done according to clause 6.6.3 of 3GPP TS 36.211 with $P\in\{1,2\}$. The UE shall assume antenna ports $R_{2000}$ and $R_{2001}$ are used for the transmission of the narrowband physical broadcast channel.

The block of complex-valued symbols $y^{(p)}(0), \ldots y^{(p)}(M_{symb}-1)$ for each antenna port is transmitted in subframe 0 during 64 consecutive radio frames starting in each radio frame fulfilling $n_f$ mod 64=0 and shall be mapped in sequence starting consecutive radio frames starting with y(0) to resource elements (k,l) not reserved for transmission of reference signals shall be in increasing order of the first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe $k_0$ according to section 16.6 of TS36.213 after every 4th NPDCCH subframe with $c_{init}=\lfloor n_s/2\rfloor 2^9+N_{ID}^{Ncell}$ where $n_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols $y(0), \ldots y(M_{symb}-1)$ shall be mapped in sequence starting with y(0) to resource elements (k,l) on the associated antenna port which meet all of the following criteria:

- they are part of the NCCE(s) assigned for the NPDCCH transmission, and
- they are not used for transmission of NPBCH, NPSS, or NSSS, and
- they are assumed by the UE not to be used for NRS, and
- they are not overlapping with resource elements used for PBCH, PSS, SSS, or CRS as defined in clause 6 of TS36.211 (if any), and
- the index l in the first slot in a subframe fulfils $l\geq N_{PDCCHStart}$ where $l_{NPDCCHStart}$ is given by clause 16.6.1 of 3GPP TS 36.213.

The mapping to resource elements (k,l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

- Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

- Starting number of NPRACH repetitions (2 bits), Subcarrier indication of NPRACH (6 bits), All the remaining bits in format N1 are set to one.

Otherwise,

- Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with a RA-RNTI, then the following fields among the fields above are reserved:

New data indicator, HARQ-ACK resource

If the number of information bits in format N1 is less than that of format N0, zeros shall be appended to format N1 until the payload size equals that of format N0.

DCI Format N2

DCI format N2 is used for paging and direct indication. The following information is transmitted by means of the DCI format N2.

Flag for paging/direct indication differentiation (1 bit)

If Flag=0:

Direct Indication information (8 bits), Reserved information bits are added until the size is equal to that of format N2 with Flag=1

If Flag=1:

Resource assignment (3 bits), Modulation and coding scheme (4 bits), Repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level $L' \in \{1,2\}$ and repetition level $R \in \{1,2,4,8,16,32,64,128,256,512,1024,2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$ where $k_b$ is the $b^{th}$ consecutive NB-IoT DL subframe from subframe k0, excluding subframes used for transmission of SI messages, and $b=u \cdot R$, and $$u = 0, 1, \ldots, \frac{R_{max}}{R} - 1,$$

and where subframe k0 is a subframe satisfying the condition $(10n_f + \lfloor n_s/2 \rfloor \bmod T) = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space, the UE shall monitor the NPDCCH UE-specific search space on the higher layer configured NB-IoT carrier, the UE is not expected to receive NPSS, NSSS, NPBCH on the higher layer configured NB-IoT carrier.

otherwise, the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows if higher layer parameter eutraControlRegionSize is present $l_{NPDCCHStart}$ is given by the higher layer parameter eutraControlRegionSize Otherwise, $l_{NPDCCHStart}=0$ Narrowband Reference Signal (NRS)

Before a UE obtains operationModeInfo, the UE may assume narrowband reference signals are transmitted in subframes #0 and #4 and in subframes #9 not containing NSSS.

When UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and shall not expect narrowband reference signals in other downlink subframes.

When UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17 below.

$$d_l(n) = S(l) \cdot e^{-j\frac{\pi u n(n+1)}{11}}, \; n = 0, 1, \ldots, 10 \qquad \text{[Equation 17]}$$

where the Zadoff-Chu root sequence index u=5 and S(l) for different symbol indices l is given by Table 27.

Table 27 shows an example of S(l).

TABLE 27

| Cyclic prefix length | S(3), . . . ,S(13) | | | | | | | | | |
|---|---|---|---|---|---|---|---|---|---|---|
| Normal | 1 | 1 | 1 | 1 | −1 | −1 | 1 | 1 | 1 | −1 | 1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k,l) in increasing order of first the index $k=0, 1, \ldots, N_{sc}^{RB}-2$ and then the index $l=3, 4, \ldots, 2N_{symb}^{DL}-1$ in subframe 5 in every radio frame. For resource elements (k,l) overlapping with resource elements where cell-specific reference signals are transmitted, the corresponding sequence element d(n) is not used for the NPSS but counted in the mapping process.

Narrowband Secondary Synchronization Signals (NSSS)

The sequence d(n) used for the narrowband secondary synchronization signal is generated from a frequency-domain Zadoff-Chu sequence according to Equation 18 below.

$$d(n) = b_q(n) \cdot e^{-j2\pi\theta_f n} \cdot e^{-j\frac{\pi u n'(n'+1)}{131}} \quad \text{[Equation 18]}$$

where $$n = 0, 1, \ldots, 131$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

The binary sequence $b_q(n)$ is given by Table 28. The cyclic shift $\theta_f$ in frame number $n_f$ is given by $$\theta_f = \frac{33}{132}(n_f/2) \bmod 4.$$

Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1] |
| 2 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1] |
| 3 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1] |

The same antenna port shall be used for all symbols of the narrowband secondary synchronization signal within a subframe. UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k,l) in sequence starting with d(0) in increasing order of the first the index k over the 12 assigned subcarriers and then the index l over the assigned last $N_{symb}^{NSSS}$ symbols of subframe 9 in radio frames fulfilling $n_f$ mod 2=0, where $N_{symb}^{NSSS}$ is given by Table 29.

Table 29 shows an example of the number of NSSS symbols.

TABLE 29

| Cyclic prefic length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19 below.

$$s_l^{(p)}(t) = \sum_{k=-\lfloor N_{sc}^{RB}/2 \rfloor}^{\lceil N_{sc}^{RB}/2 \rceil - 1} a_{k^{(-)},l}^{(p)} \cdot e^{j2\pi\left(k+\frac{1}{2}\right)\Delta f\left(t - N_{CP,i} T_s\right)} \quad \text{[Equation 19]}$$

for $0 \le t < (N_{CP,i} + N) \times T_s$ where $k^{(-)} = k + \lfloor N_{RB}^{DL} N_{sc}^{RB} / 2 \rfloor$, $N = 2048$, $\Delta f = 15$ kHz and $a_{k,l}^{(p)}$ is the content of resource element (k,l) on antenna port p.

If the higher layer parameter operationModeInfo indicates 'inband-SamePCI' or samePCI-Indicator indicate 'samePCI', then the time-continuous signal $s_l^{(p)}(t)$ on antenna port p in OFDM symbol l', where $l'=l+N_{symb}^{DL}(n_s \bmod 4) \in \{0, \ldots, 27\}$ is the OFDM symbol index from the start of the last even-numbered subframe, is defined by Equation 20 below.

$$s_l^{(p)}(t) = \sum_{k=-\lfloor N_{RB}^{DL} N_{sc}^{RB}/2 \rfloor}^{-1} e^{\theta_{k^{(-)}}} a_{k^{(-)},l}^{(p)} \cdot e^{j2\pi k\Delta f\left(t - N_{CP,l' \bmod N_{symb}^{DL}} T_s\right)} + \sum_{k=1}^{\lceil N_{RB}^{DL} N_{sc}^{RB}/2 \rceil} e^{\theta_{k^{(+)}}} a_{k^{(+)},l}^{(p)} \cdot e^{j2\pi k\Delta f\left(t - N_{CP,l' \bmod N_{symb}^{DL}} T_s\right)} \quad \text{[Equation 20]}$$

for $0 \le t < (N_{CP,i} + N) \times T_s$ where $k^{(-)} =$ $$k + \lfloor N_{RB}^{DL} N_{sc}^{RB} / 2 \rfloor \text{ and } k^{(+)} = k + \lfloor N_{RB}^{DL} N_{sc}^{RB} / 2 \rfloor - 1,$$

$$\theta_{k,l'} = j2\pi f_{NB-IoT} T_s \left( N + \sum_{i=0}^{l'} N_{CP,i\,mod\,7} \right)$$

if resource element (k,l') is used for Narrowband IoT, and 0 otherwise, and $f_{NB-IoT}$ is the frequency location of the carrier of the Narrowband IoT PRB minus the frequency location of the center of the LTE signal.

Only normal CP is supported for Narrowband IoT downlink in this release of the specification.

Hereinafter, the physical layer process of the narrowband physical broadcast channel (NPBCH) will be described in more detail.

Scrambling

Scrambling shall be done according to clause 6.6.1 with $M_{bit}$ denoting the number of bits to be transmitted on the NPBCH. $M_{bit}$ equals 1600 for normal cyclic prefix. The scrambling sequence shall be initialised with $c_{init}=N_{ID}^{Ncell}$ in radio frames fulfilling $n_f$ mod 64=0.

Modulation

Modulation shall be done according to clause 6.6.2 using the modulation scheme in Table 10.2.4.2-1.

Table 30 shows an example of a modulation scheme for NPBCH.

TABLE 30

| Physical channel | Modulation schemes |
|---|---|
| NPBCH | QPSK |

Layer Mapping and Precoding

Layer mapping and precoding shall be done according to clause 6.6.3 with P∈{1,2} The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f$ mod 64=0 and shall be mapped in sequence starting with y(0) to resource elements (k,l). The mapping to resource elements (k,l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\bullet)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2.

Next, information related to MIB-NB and SIBN1-NB will be described in more detail.

MasterInformationBlock-NB

The MasterInformationBlock-NB includes the system information transmitted on BCH.

Signalling radio bearer: N/A

RLC-SAP: TM

Logical channel: BCCH

Direction: E-UTRAN to UE

Table 31 shows an example of the MasterInformationBlock-NB format.

TABLE 31

```
-- ASN1START
MasterInformationBlock-NB ::=      SEQUENCE {
        systemFrameNumber-MSB-r13           BIT STRING (SIZE (4)),
        hyperSFN-LSB-r13                    BIT STRING (SIZE (2)),
        schedulingInfoSIB1-r13              INTEGER (0..15),
        systemInfoValueTag-r13              INTEGER (0..31),
        ab-Enabled-r13                      BOOLEAN,
        operationModeInfo-r13       CHOICE {
            inband-SamePCI-r13                  Inband-SamePCI-NB-r13,
            inband-DifferentPCI-r13             Inband-DifferentPCI-NB-r13,
            guardband-r13                       Guardband-NBr-13,
            standalone-r13                      Standalone-NB-r13
        },
        spare                               BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=            SEQUENCE {
        rasterOffset-r13            ChannelRasterOffset-NB-r13,
        spare                               BIT STRING (SIZE (3))
}
Inband-SamePCI-NB-r13 ::=       SEQUENCE {
        eutra-CRS-SequenceInfo-r13      INTEGER (0..31)
}
Inband-DifferentPCI-NB-r13 ::=     SEQUENCE {
        eutra-NumCRS-Ports-r13              ENUMERATED {same, four},
        rasterOffset-r13                ChannelRasterOffset-NB-r13,
        spare                               BIT STRING (SIZE (2))
}
Standalone-NB-r13 ::=              SEQUENCE {
        spare                               BIT STRING (SIZE (5))
}
-- ASN1STOP
```

Table 32 shows the description of the MasterInformationBlock-NB field.

TABLE 32

| MasterInformationBlock-NB field descriptions |
| --- |
| ab-Enabled |
| Value TRUE indicates that access barring is enabled and that the UE shall acquire SystemInformationBlockType14-NB before initiating RRC connection establishment or resume.<br>eutra-CRS-SequenceInfo |
| Information of the carrier containing NPSS/NSSS/NPBCH.<br>Each value is associated with an E-UTRA PRB index as an offset from the middle of the LTE system sorted out by channel raster offset.<br>eutra-NumCRS-Ports |
| Number of E-UTRA CRS antenna ports, either the same number of ports as NRS or 4 antenna ports.<br>hyperSFN-LSB |
| Indicates the 2 least significant bits of hyper SFN. The remaining bits are present in SystemInformationBlockType1-NB.<br>operationModeInfo |
| Deployment scenario (in-band/guard-band/standalone) and related information. See TS 36.211 [21] and TS 36.213 [23].<br>Inband-SamePCI indicates an in-band deployment and that the NB-IoT and LTE cell share the same physical cell id and have the same number of NRS and CRS ports.<br>Inband-DifferentPCI indicates an in-band deployment and that the NB-IoT and LTE cell have different physical cell id. |

TABLE 32-continued

| MasterInformationBlock-NB field descriptions |
| --- |
| guardband indicates a guard-band deployment.<br>standalone indicates a standalone deployment.<br>rasterOffset |
| NB-IoT offset from LTE channel raster. Unit in kHz in set {−7.5, −2.5, 2.5, 7.5}<br>schedulingInfoSIB1 |
| This field contains an index to a table specified in TS 36.213 [23, Table 16.4.1.3-3] that defines SystemInformationBlockType1-NB scheduling information.<br>systemFrameNumber-MSB |
| Defines the 4 most significant bits of the SFN. As indicated in TS 36.211 [21], the 6 least significant bits of the SFN are acquired implicitly by decoding the NPBCH.<br>systemInfoValueTag |
| Common for all SIBs other than MIB-NB, SIB14-NB and SIB16-NB. |

SystemInformationBlockType1-NB

The SystemInformationBlockType1-NB message contains information relevant when evaluating if a UE is allowed to access a cell and defines the scheduling of other system information.

Signalling radio bearer: N/A

RLC-SAP: TM

Logical channel: BCCH

Direction: E-UTRAN to UE

Table 33 shows an example of a SystemInformationBlockType1 (SIB1)-NB message.

TABLE 33

```
-- ASN1START
SystemInformationBlockType1-NB ::=     SEQUENCE {
    hyperSFN-MSB-r13                       BIT STRING (SIZE (8)),
    cellAccessRelatedInfo-r13          SEQUENCE {
        plmn-IdentityList-r13              PLMN-IdentityList-NB-r13,
        trackingAreaCode-r13               TrackingAreaCode,
        cellIdentity-r13                   CellIdentity,
        cellBarred-r13                         ENUMERATED {barred, notBarred},
        intraFreqReselection-r13           ENUMERATED {allowed, notAllowed}
    },
    cellSelectionInfo-r13              SEQUENCE {
        q-RxLevMin-r13                         Q-RxLevMin,
        q-QualMin-r13                          Q-QualMin-r9
    },
    p-Max-r13                              P-Max                      OPTIONAL,      -- Need OP
    freqBandIndicator-r13              FreqBandIndicator-NB-r13,
    freqBandInfo-r13                   NS-PmaxList-NB-r13             OPTIONAL,      -- Need OR
    multiBandInfoList-r13              MultiBandInfoList-NB-r13    OPTIONAL,     -- Need OR
    downlinkBitmap-r13                     DL-Bitmap-NB-r13                OPTIONAL,    -- Need OP,
    eutraControlRegionSize-r13         ENUMERATED {n1, n2, n3}            OPTIONAL,    -- Cond inband
    nrs-CRS-PowerOffset-r13                ENUMERATED {dB-6,       dB-4dot77, dB-3,
                                                   dB-1dot77, dB0,       dB1,
                                                   dB1dot23,  dB2,       dB3,
                                                   dB4,          dB4dot23,  dB5,
                                                   dB6,          dB7,       dB8,
                                                   dB9}       OPTIONAL,     -- Cond inband-
SamePCI
    schedulingInfoList-r13             SchedulingInfoList-NB-r13,
    si-WindowLength-r13                    ENUMERATED {ms160,  ms320,  ms480,  ms640,
                                                ms960,    ms1280, ms1600, spare1},
    si-RadioFrameOffset-r13                INTEGER (1..15)    OPTIONAL,    --Need OP
    systemInfoValueTagList-r13         SystemInfoValueTagList-NB-r13 OPTIONAL,    -- Need OR
    lateNonCriticalExtension           OCTET STRING                 OPTIONAL,
    nonCriticalExtension               SEQUENCE { }                        OPTIONAL
}
PLMN-IdentityList-NB-r13 ::=          SEQUENCE (SIZE (1..maxPLMN-r11)) OF PLMN-IdentityInfo-NB-r13
PLMN-IdentityInfo-NB-r13 ::=          SEQUENCE {
    plmn-Identity-r13                      PLMN-Identity,
    cellReseivedForOperatorUse-r13         ENUMERATED {reserved, notReseived},
    attachWithoutPDN-Connectivity-r13      ENUMERATED {true} OPTIONAL --Need OP
}
SchedulingInfoList-NB-r13 ::= SEQUENCE (SIZE (1..maxSI-Message-NB-r13)) OF SchedulingInfo-NB-r13
```

TABLE 33-continued

```
SchedulingInfo-NB-r13::=          SEQUENCE {
    si-Periodicity-r13                  ENUMERATED {rf64, rf128, rf-256, rf512,
                                                  rf1024, rf2048, rf-4096, spare},
    si-RepetitionPattern-r13            ENUMERATED {every2ndRF, every4thRF,
                                                  every8thRF, every16thRF},
    sib-MappingInfo-r13               SIB-MappingInfo-NB-r13,
    si-TB-r13               ENUMERATED {b56, b120, b208, b256, b328, b440, b552, b680}
}
SystemInfoValueTagList-NB-r13 ::=     SEQUENCE (SIZE (1.. maxSI-Message-NB-r13)) OF
                                             SystemInfoValueTagSI-r13
SIB-MappingInfo-NB-r13 ::=              SEQUENCE (SIZE (0..maxSIB-1)) OF SIB-Type-NB-r13
SIB-Type-NB-r13 ::=                     ENUMERATED {
                                             sibType3-NB-r13, sibType4-NB-r13, sibType5-NB-r13,
                                             sibType14-NB-r13, sibType16-NB-r13, spare3, spare2, spare1}
-- ASN1STOP
```

Table 34 shows the description of the SystemInformationBlockType1-NB field.

TABLE 34

| SystemInformationBlockType1-NB field descriptions |
|---|
| attachWithoutPDN-Connectivity<br>If present, the field indicates that attach without PDN connectivity as specified in TS 24.301 [35] is supported for this PLMN. |
| cellBarred<br>Barred means the cell is barred, as defined in TS 36.304 [4]. |
| cellIdentity<br>Indicates the cell identity. |
| cellReservedForOperatorUse<br>As defined in TS 36.304 [4]. |
| cellSelectionInfo<br>Cell selection information as specified in TS 36.304 [4]. |
| downlinkBitmapNB-IoT downlink subframe configuration for downlink transmission.<br>If the bitmap is not present, the UE shall assume that all subframes are valid (except for subframes carrying NPSS/NSSS/NPBCH/SIB1-NB) as specified in TS 36.213[23] |
| eutraControlRegionSize<br>Indicates the control region size of the E-UTRA cell for the in-band operation mode. Unit is in number of OFDM symbols. |
| freqBandIndicator<br>A list of as defined in TS 36.101 [42, table 6.2.4-1] for the frequency band in freqBandIndicator. |
| freqBandInfo<br>A list of additionalPmax and additionalSpectrumEmission values as defined in TS 36.101 [42, table 6.2.4-1] for the frequency band in freqBandIndicator. |
| hyperSFN-MSB<br>Indicates the 8 most significat bits of hyper-SFN. Together with hyperSFN-LSB in MIB-NB, the complete hyper-SFN is built up. hyper-SFN is incremented by one when the SFN wraps around. |
| intraFreqReselection<br>Used to control cell reselection to intra-frequency cells when the highest ranked cell is barred, or treated as barred by the UE, as specified in TS 36.304 [4]. |
| multiBandInfoList<br>A list of additional frequency band indicators, additionalPmax and additionalSpectrumEmission values, as defined in TS 36.101 [42, table 5.5-1]. If the UE supports the frequency band in the freqBandIndicator IE it shall apply that frequency band. Otherwise, the UE shall apply the first listed band which it supports in the multiBandInfoList IE. |
| nrs-CRS-PowerOffset<br>NRS power offset between NRS and E-UTRA CRS. Unit in dB. Default value of 0. |
| plmn-IdentityList<br>List of PLMN identities. The first listed PLMN-Identity is the primary PLMN. |
| p-Max<br>Value applicable for the cell. If absent the UE applies the maximum power according to the UE capability. |
| q-QualMin<br>Parameter “Qqualmin” in TS 36.304 [4]. |
| q-RxLevMin<br>Parameter Qrxlevmin in TS 36.304 [4]. Actual value Qrxlevmin = IE value * 2 [dB]. |
| schedulingInfoList<br>Indicates additional scheduling information of SI messages. |
| si-Periodicity<br>Periodicity of the SI-message in radio frames, such that rf256 denotes 256 radio frames, rf512 denotes 512 radio frames, and so on. |

TABLE 34-continued

| SystemInformationBlockType1-NB field descriptions |
|---|
| si-RadioFrameOffset<br>Offset in number of radio frames to calculate the start of the SI window.<br>If the field is absent, no offset is applied. |
| si-RepetitionPattern<br>Indicates the starting radio frames within the SI window used for SI message transmission. Value every2ndRF corresponds to every second radio frame, value every4thRF corresponds to every fourth radio frame and so on starting from the first radio frame of the SI window used for SI transmission. |
| si-TB<br>This field indicates the transport block size in number of bits used to broadcast the SI message. |
| si-WindowLength<br>Common SI scheduling window for all SIs. Unit in milliseconds, where ms 160 denotes 160 milliseconds, ms320 denotes 320 milliseconds and so on. |
| sib-MappingInfo<br>List of the SIBs mapped to this Systeminformation message.There is no mapping information of SIB2; it is always present in the first SystemInformation message listed in the schedulingInfoList list. |
| systemInfoValueTagList<br>Indicates SI message specific value tags. It includes the same number of entries, and listed in the same order, as in SchedulingInfoList. |
| systeminfo ValueTagSI<br>SI message specific value tag as specified in Clause 5.2.1.3. Common for all SIBs within the SI message other than SIB 14. |
| trackingAreaCode<br>A trackingAreaCode that is common for all the PLMNs listed. |

TABLE 35

| Conditional presence | Explanation |
|---|---|
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

'/' described in the present disclosure can be interpreted as 'and/or', and 'A and/or B' may be interpreted as having the same meaning as 'including at least one of A or (and/or) B'.

Hereinafter, a method for improving mobility of LTE-MTC by improving measurement performance such as Reference Signal Received Power (RSRP)/Reference Signal Received Quality (RSRQ) proposed in the present disclosure will be described.

More specifically, the present disclosure relates to a method of improving the mobility of LTE-MTC by using the RSS (Resynchronization signal) introduced to reduce system acquisition time in Rel-15 LTE-MTC for measurement such as the RSRQ/RSRP and the like. The method proposed in the present disclosure may be largely composed of the following three methods.

The first method is a method of configuring an antenna port of the RSS in order to use the RSS together with a cell-specific reference signal (CRS) used in the conventional RSRP/RSRQ measurement method. The second method relates to a method for using the RSS for measurement and configuring measurement gap (MG). The third method relates to a measurement operation method using the CRS and/or the RSS of a terminal (e.g., UE).

In the present disclosure, the meaning of a serving cell may mean a cell in which the UE performs a connection (re-)establishment procedure through initial access, and may be interpreted as a meaning of a primary cell or the like according to a system. Alternatively, in the present disclosure, the serving cell may be interpreted as a reference cell in a more general sense.

First Embodiment: A Method of Configuring an RSS (Antenna) Port for Measurement

The RSS introduced to reduce system acquisition time has no restrictions on the use of the RSS port except that the RSS transmission port is maintained for 2 subframes. However, the RSS port is intended to use the same port as the CRS only when the CRS is transmitted through 1 port. In this situation, when measuring the RSRP/RSRQ using the RSS in addition to the CRS, the RSS port may be configured to use CRS port 0. This method can consider the following four methods.

(Method P-1): Method for Fixing RSS Port to CRS Port 0

Method P-1 restricts the RSS and the CRS to use the same port (e.g., port 0).

The simplest way for the UE to perform measurement using the RSS and the CRS using the same port (e.g., port 0) always configured is to eliminate port ambiguity of the RSS and the CRS.

(Method P-2): Method for Fixing RSS Port to CRS 2 Port (e.g., Port 0 and Port 1)

Method P-2 has an advantage that transmission diversity (Tx diversity) for the RSS is possible, compared to the Method P-1, by fixing the RSS port to the CRS 2 port (e.g., port 0 and port 1).

(Method P-3): Method for Configuring RSS Port to Perform Port Cycling within CRS 2 Port or 4 Port Method P-3 is a method for the RSS port to performing the port cycling in a time direction within the CRS 2 port or 4 port, and has an advantage of obtaining a space diversity gain during RSS transmission.

The RSS port cycling unit in the time direction may be 2 subframes, which is the same as the conventional RSS port fixed unit, or in order to obtain a space diversity gain at an earlier time, a symbol unit or a slot unit or a subframe unit, or may be a unit of multiple subframes configured by RRC signaling. Alternatively, the RSS port cycling unit may allow the port cycling to be performed in a frequency direction (e.g., in RB or NB (narrowband) units).

For example, assuming that the CRS port=0/1/2/3, the RSS configuration minimum unit=8 ms, and the RSS port must be maintained for 2 subframes, the RSS port cycling sequence for each subframe can be defined as follows.

RSS port cycling sequence in a subframe: 0→0→1→1→2→2→3→3

Method P-3 includes not only the RSS port cycling within the CRS port, in the situation of configuring each RSS port (and precoding) to have a QCL (quasi-co located) relationship with each port of the CRS, 1:1 or 1:M (M>1), but also performing port (and precoding) cycling between each CRS port and each RSS port (and precoding) having the QCL relationship.

(Method P-4) QCL Assumption Setup Method Between RSS Port and CRS Port

Method P-4 does not restrict the RSS port to select one of the CRS ports, but is to limit to satisfy only the QCL relationship between the RSS port and the CRS port, assuming that there is no significant difference in terms of short term or long term from the viewpoint of RSRP/RSRQ measurement. As mentioned in Method P-3, the port (and precoding) cycling may be applied under the assumption of the QCL for space diversity.

Regarding the method of configuring the RSS port for the measurement above, in order to provide the base station with the flexibility of the method of configuring the RSS port according to the situation, the base station can be configured to signal RSS port (configuration) related information to the UE.

As the signaling method of the RSS port related information, (1) the RSS port information may be directly transmitted to the UE (e.g., indication of one of the above methods P-1/P-2/P-3), or (2) RSS transmission mode (e.g., RSS port Tx diversity on/off, RSS port cycling on/off, etc.) information may be transmitted to the UE, or (3) QCL on/off information may be transmitted to the UE. For example, the QCL off information may be used for the purpose of commanding (or recommending) the UE not to use the RSS for measurement.

Second Embodiment: RSS or Measurement Configuration Method

The second embodiment, in order to improve RSRP/RSRQ measurement performance using the RSS, when the measurement is configured, relates to a method of configuring 1) RSS power boosting information (e.g., RSS-to-CRS power ratio), 2) RSS configuration information, 3) RSS transmission information, 4) RSS sequence information (including RSS cover code information), 5) CRS port information, and the like, for each component carrier (CC) or cell to be measured.

That is, in the second embodiment, the RSS port is mapped to a resource to which the CRS port is not mapped and transmitted, and power information of the RSS port is obtained through power information of the CRS port.

The measurement configuration information may be configured for each CC or cell for all or some CCs or cells within inter-frequency and/or intra-frequency.

Alternatively, all or some of the above-mentioned measurement objects may not be configured for each CC or cell, but may be configured as one or multiple measurement objects commonly applied to all or multiple CCs or cells.

The following are descriptions and detailed features of each measurement object described above.

RSS Power Boosting Information (e.g., RSS-to-CRS Power Ratio)

In order to apply the RSS to RSRP/RSRQ measurement, measurement configuration information must include RSS power reference or boosting information. The RSS power reference or boosting information may be a value relative to CRS power (e.g., RSS-to-CRS power ratio).

For a cell for which the RSS power reference or boosting information is not configured, the UE assumes the same value as the serving cell, or cannot assume the RSS in the corresponding cell, or does not use the RSS when measuring in the corresponding cell.

RSS Configuration Information

The RSS configuration information is information indicating whether the RSS is supported for each CC or cell, or whether the RSRP/RSRQ measurement using the RSS is supported.

Using the RSS configuration information, the UE may perform measurement using only the CRS in a corresponding cell or CC, or may perform measurement using the CRS and/or the RSS.

When the RSS configuration is different for each CC or cell, the following operation method of a base station or a terminal is proposed.

(1) For a CC or cell where the RSS is not supported, or RSRP/RSRQ measurement using the RSS is not supported, the RSRP/RSRQ measurement requirement for the base station and/or the terminal is relaxed (relaxation).

(2) The base station and/or the terminal may differently configure a duration and/or a period of an MG pattern depending on whether the RSS is supported or whether the RSRP/RSRQ measurement using the RSS is supported. For example, when the RSS is supported or the RSRP/RSRQ measurement using the RSS is supported, an MG pattern having a short MG duration and/or a large MG period may be configured because of performance improvement due to the use of the RSS. Alternatively, when the RSS is not supported or the RSRP/RSRQ measurement using the RSS is not supported, an MG pattern having a large MG duration and/or a short MG period may be configured to prevent performance reduction due to not using RSS.

(3) Alternatively, the base station and/or the terminal may selectively apply a new measurement configuration(s) or a RSS configuration method(s) proposed in the third embodiment to be described later according to whether the RSS is supported or whether the RSRP/RSRQ measurement using the RSS is supported.

(4) When the RSS is not supported or the RSRP/RSRQ measurement using the RSS is not supported, (additional) power boosting of the CRS may be applied to prevent performance reduction due to non-use of RSS. The (additional) power boosting of the CRS has an effect of offsetting decrease in measurement performance due to not using RSS.

(5) The base station and/or the terminal may process reliability of a measurement value differently depending on whether the RSS is supported for each CC or cell or whether the RSRP/RSRQ measurement using the RSS is supported for each CC or cell. For example, when a decision threshold for cell selection/reselection is applied differently, or when a decision is made through a measurement value, a confidence count value is applied differently.

Since the RSS is a cell-specifically configured value, the measurement configuration information includes the RSS configuration information in order to apply the RSS to the RSRP/RSRQ measurement.

For a cell for which the RSS configuration information is not configured, the UE assumes the same configuration as the serving cell, or cannot assume the RSS in the corresponding cell, or does not use the RSS when measuring in the corresponding cell.

RSS Transmission Information

The information of RSS transmission duration (for example, RSS timing offset or starting SFN (System Frame Number) information) and subframe (hereinafter referred to as RSS subframe) capable of RSS transmission is directly indicated in bitmap format (RSS transmission is not possible for remaining duration or subframe), or indirectly indicated in BL/CE DL subframe bitmap format (RSS transmission only for BL/CE DL subframe, remaining duration is postponed or punctured) or MBSFN subframe bitmap format (RSS transmission only in non-MBSFN subframe, MBSFN duration is postponed or punctured). Alternatively, the RSS transmission information may be in the form of an RSS duration, period, and time offset.

The RSS transmission duration or subframe information may be information that counts only the valid duration or subframe that can actually transmit the RSS, or a duration or subframe between a start and an end of the RSS transmission (including invalid duration or subframe from the viewpoint of the RSS transmission).

RSS Sequence Information (Including RSS Cover Code Information)

The RSS sequence is composed of a random sequence and a subframe-level cover code. The RSS random sequence is initialized by Cell ID (Physical Cell ID or Virtual CID) information and SI (system information) update information (a higher layer parameter systemInfoUnchanged-BR-R15).

Therefore, the measurement configuration may include Cell ID (Physical Cell ID or Virtual CID) information and SI (system information) update information (a higher layer parameter systemInfoUnchanged-BR-R15 and/or an SI validity timer value) so that the RSS sequence for the corresponding cell can be reproduced. In addition, the measurement configuration includes RSS subframe-level cover code information. When the RSS subframe-level cover code information has a 1:1 mapping relationship with an RSS subframe length, it may be replaced with information corresponding to the RSS subframe length. Or, when using RSS for neighbor cell measurement, systemInfoUnchanged-BR may be allowed to assume a specific value (e.g., true or false).

CRS Port Information

In the case of conventional neighbor cell measurement using the CRS, CRS port 0 was assumed. However, by additionally transmitting CRS port information to the UE, the base station can expect improvement in measurement performance due to an increase in the number of CRS Resource Elements (REs) used for measurement.

The RSS transmission RE in an RSS subframe may be punctured by the CRS (current Rel-15 LTE-MTC operation). When the CRS port information is not configured, the UE may operate assuming the maximum number of CRS ports (e.g., 4 ports) when measuring the RSRP/RSRQ using the RSS sequence. When the actual CRS transmission port is less than the maximum number of CRS ports, the base station additionally transmits the CRS port information to the UE, so that an RSS RE equal to the difference between the maximum CRS port and the actual CRS transmission port can be additionally used for measurement.

In addition, in order to support the method for configuring the RSS port (Method P-3 or Method P-4) for the measurement, a port relationship or QCL information between the RSS and the CRS may be additionally configured. Since CRS port configuration setting, RSS port configuration, and QCL relationship may be different between cells, the corresponding information should be included in the measurement configuration information.

The measurement object including the information may not be configured based on the center carrier of the RSS. That is, even if frequency resources of the RSS between cells do not overlap each other, in the case of being able to accommodate the measurement bandwidth (e.g., 6RB of NB size) from the standpoint of the terminal performing the measurement, one measurement object is given. However, for each cell, all of the information may be provided within one measurement object. Here, RSS location information for each cell within the measurement object may be given as a logical index within the measurement bandwidth.

Third Embodiment: Method for Configuring Measurement Interval (MG)

The MG Gap Pattern (MGP) and RSS configuration of Rel-15 LTE-MTC are summarized as follows.

Measurement Gap (MG) Pattern Configuration (Inter-Frequency Measurement Duration)

- MGP #0: MG Period (MGP) 40 ms; MG Length (MGL) 6 ms; MG Offset (MGO) can be configured in ms within MGP
- MGP #1: MG Period (MGP) 80 ms; MG Length (MGL) 6 ms; MG Offset (MGO) can be configured in ms within MGP RSS Configuration RSS duration: {8, 16, 32, 40} ms RSS period: {160, 320, 640, 1280} ms RSS time offset can be configured within a period in 1/2/4 frame units When using the RSS for the measurement based on the MGP and the RSS configuration as described above, the RSS may not always exist or may exist partially within the periodic MG duration (unless the configuration is modified).

FIG. 8 is a diagram illustrating an example of a method for configuring a measurement interval pattern and an RSS.

That is, FIG. 8 is an example of the conventional MGP #0, MGP #1, and the RSS configuration of the shortest period. As shown in FIG. 8, when the RSS is configured with the shortest period (160 ms) by the conventional method, the measurement using the RSS may be performed only once every 4 times for MGP #0, and once every 2 times for MGP #1, during the MG duration.

As shown in FIG. 8, when the existing technology is applied and the terminal can use the RSS for the measurement, the terminal may not actually perform measurement in the MGP that does not include the RSS, and be configured to expect MPDCCH/PDSCH reception from the base station. This is more suitable when the RSS is used only for serving cell measurement, and to enable the MGP duration that does not overlap with the RSS duration to be used to improve throughput through MPDCCH/PDSCH reception.

As shown in FIG. 8, when using the RSS for the measurement based on the existing MGP and the RSS configuration, if the configuration of the CRS and the RSS available for the measurement for each MG duration is different, there is a limit to the improvement of measurement performance using RSS, and the terminal may be complicated. Therefore, in order to improve RSRP/RSRQ measurement performance using the RSS, a method of configuring the MGP period to an integer multiple of the RSS period will be described below. The above-described method can be implemented as follows.

(Method 1): Method of Match an MGP Period to a Period or an Integer Multiple of the Period in the RSS (or RSS of the Minimum Period) Configuration Method 1 is to configure the MGP period so that the period of the MGP coincides with the minimum period in the RSS configuration (see FIG. 9*a*).

FIG. 9 illustrates an example of an MGP configuration method proposed in the present disclosure.

(Method 2): Method for Matching a Period of the RSS (or RSS of the Minimum Period) Configuration to a Period of MGP #0 and/or MGP #2

Method 2 supports, for example, the RSS configuration in which a period in the RSS configuration has the same value as the maximum period (80 ms of MGP #2) in the MGP configuration (see FIG. 10*b*).

FIG. 10 illustrates another example of an MGP configuration method proposed in the present disclosure.

In order to improve the RSRP/RSRQ measurement performance using the above RSS, the base station and/or the terminal apply a method of configuring the MGP period as an integer multiple of the RSS period, so that uniform performance between measurements can be expected. Through this, the operation of the terminal for determining the measurement requirement and satisfying the corresponding measurement requirement can be simplified.

In addition, the MGP and RSS configuration information may be used by the UE to determine whether to calculate the RSRP/RSRQ using only the CRS or to calculate the RSRP/RSRQ using the CRS and the RSS. For example, if the RSS duration in the MGL (MG length) includes X subframe or Y % or more of the MGL, the CRS and the RSS may be used for calculation of the RSRP/RSRQ, otherwise the measurement may be performed using the CRS only and reported to the base station.

Alternatively, as shown in FIG. 8, when the RSS period is larger than the MG period, if a value obtained by dividing the RSS period by the MG period is Z or more, the improvement in measurement performance due to the use of the RSS compared to the complexity is not large, so the RSRP/RSRQ measurement using the CRS only may be performed.

Here, the X, Y, and Z values may be fixed in the related 3GPP TS specification, or may be included in the measurement configuration as values configured by higher layer configuration.

The X, Y, and Z values may be configured for each CC or cell for all or some CCs or cells within the inter-frequency and/or intra-frequency.

Alternatively, the X, Y, and Z values may not be configured for each CC or cell, but may be configured as one or multiple measurement objects commonly applied to all or multiple CCs or cells.

The RSRP/RSRP measurement performance is proportional to the number of measured REs. In consideration of the fact that the number of RSS measurement samples in a single NB is greater than that of the existing CRS (about 7 times), hereinafter, a method of configuring a smaller MGL (or short MGL) than the existing MGL will be described.

For example, regardless of the RSS duration, short MGL of about 1/2/4 ms may be additionally configured in addition to the existing MGL 6 ms (fixed). This method may be additionally applied to the method of configuring the RSS period proposed above to be the same as the MGP period.

In addition to the method of configuring an MGL smaller than the existing MGL, for the same reason, a method of defining the RSS duration as a value equal to or smaller than the existing MGL may be considered. This method may be additionally applied to the method of configuring the RSS period proposed above to be the same as the MGP period. Here, the cover code of RSS needs to match the newly defined RSS duration, and the following options are possible.

(Option 1)

In the case of Option 1, the RSS cover code of anew duration is used sequentially from the frontmost sequence of the existing RSS cover code, and the remaining sequences are not used.

The sequence of the front part of the RSS cover code is configured to be suitable for obtaining an antenna diversity gain, and the subsequent part is to maintain a characteristic configured to be suitable for obtaining a noise averaging gain.

(Option 2)

Option 2 is a method that matches the last sequence of the RSS cover code of a new duration with the last sequence of the existing RSS cover code and does not use the remaining previous sequence.

This may be a situation in which noise averaging gain is further required when the SNR environment of the terminal that needs to improve measurement performance using the RSS is very bad.

In this case, this is because the sequence after the front part of the RSS cover code can be used more appropriately than the front part of the RSS cover code.

(Option 3)

In the case of Option 3, the RSS cover code of a new duration is used by excluding a continuous part of the frontmost sequence and a continuous part of the last sequence of the existing RSS cover code.

In the case of Option 3, it is an intermediate step between Option 1 and Option 2, so that both the terminal with good SNR environment and the terminal without the good SNR environment can utilize the RSS for measurement.

In a resource where a RSS duration configured with a newly defined RSS period and a RSS duration for existing terminals overlap each other, the base station needs to transmit the RSS for the existing terminals preferentially. If two RSSs configured differently from each other partially overlap, the RSS configured with the newly defined RSS period may be omitted from being transmitted in the corresponding period. This is to preferentially consider backward compatibility because a terminal that understands the new RSS period also understands the configuration of the existing RSS.

The MGL is configured to include a NB switching gap (DL-to-DL NB switching gap). When switching back for DL reception after intra-frequency measurement, the existing LTE control region may not be able to absorb the DL switching time due to reasons such as inconsistent sync. between cells. To prepare for this, 1) DL switching back time of at least 2 OFDM symbols may be guaranteed (e.g., even if StartOFDM symbol=1, UE does not receive DL during 2 OFDM symbol duration), 2) DL switching time greater than 2 OFDM symbols (e.g., 3 or 4 OFDM symbols) may be selected, or 3) when the above DL switching back is required, DL switching time may be fixed to a value greater than 2 (e.g., 3 or 4 OFDM symbols).

Next, a method of configuring an additional MG (MG2) for intra-frequency (inter-NB) measurement will be described.

Considering that the NB characteristics of LTE-MTC and the RSS are configurable within a system BW, to improve measurement performance using the RSS, 1) in addition to the conventional inter-frequency MG (hereinafter referred to as 'MG1'), an additional intra-frequency MG (hereinafter referred to as 'MG2') may be configured, or 2) the conventional inter-frequency MG (MG1) may be configured including intra-frequency measurement and inter-frequency measurement. The MG2, which is additionally configured above, may be configured independently or additionally from the MG1 for inter-frequency measurement using a conventional CRS.

The MG2 configuration includes configuration parameters proposed by the RSS or measurement configuration method, which is generated by mainly using the RSS for intra-frequency and/or inter-frequency measurement. The MG2 may not include a CRS in the case of a standalone MTC operation or a subframe that cannot expect the CRS. When the CRS is not included in the MG2, an in-band LTE-MTC or a standalone MTC UE may perform the following operation.

measuring/reporting the RSRP/RSRQ with the only RSS, or assuming default configuration and measuring/reporting the RSRP/RSRQ using the CRS (or CRS and RSS), or The default configuration may assume the same configuration as the CRS of the serving cell, 1 port CRS (port 0), or the maximum CRS port (port 0/1/2/3).

When the base station and/or the terminal configures the existing inter-frequency MG (MG1) including intra-frequency measurement and inter-frequency measurement without additionally configuring the MG2, during the MG1 period, intra-frequency measurement and inter-frequency measurement are sequentially performed in a TDM scheme.

Fourth Embodiment: RSS Configuration Method for Measurement

The RSS can be configured at different PRB locations within the system BW for each CC or cell. When configuring the RSS for measurement, the position on the frequency of the RSS can be determined by the following method to reduce the overhead for the measurement configuration or for the convenience of the terminal operation.

(Method 1)

Method 1 is a method of determining the location of the RSS in conjunction with the NB.

(Method 1-1)

Method 1-1 is a method of fixing the position of the RSS to the center 2 RB in the NB.

In order to reduce signaling overhead of RSS configuration related information, a location at which the RSS can be configured is limited to a specific location within the NB, and the RSS location can be indicated by an NB index. For example, a position at which the RSS within each NB can be configured may be fixed to center 2 RB within the NB.

(Method 1-2)

Method 1-2 is a method of determining a location of the RSS in conjunction with the system BW and/or the NB location in the system BW.

When determining the RSS position within the system BW, Method 1-2 includes a method of configuring the RSS symmetrically to a center frequency, a method of exceptionally different RSS configuration for the NB composed of center 6RB or center 6RB (e.g., it is configured to accommodate multiple RSSs in center NB, and the remaining are allowed only one per NB), or a method of arranging in consideration of interference (e.g., in consideration of interference with non-NB signals (PRACH, RUCCH), a location where the RSS can be configured for each NB location is determined differently).

(Method 2)

Method 2 is a method of configuring the RSS in one NB.

Method 2 is a method of configuring a plurality of RSSs in one or minimum NB(s) for convenience of measurement (e.g., to minimize the NB switching operation during measurement) from a terminal perspective.

(Method 2-1)

Method 2-1 is a method of configuring multiple RSSs in one NB by allowing RSS overlapping.

That is, the UE can perform the RSRP/RSRQ measurement of maximum cells without NB hopping.

(Method 2-2)

Method 2-2 is a method of configuring up to 3 RSSs in one NB so that the RSSs do not overlap.

That is, Method 2-2 limits a position of the lowest RSS PRB in the NB (e.g., limited to even or odd index) so that the RSSs do not overlap. Therefore, in Method 2-2, compared to Method 2-1, measurement performance is not affected by overlap, and signaling overhead can be reduced.

(Method 2-3)

Method 2-3 is an interlace structure between RSSs.

That is, in order to avoid overlapping between RSSs or to minimize the influence of interference between adjacent RSSs on measurement, Method 2-3 is a method of configuring the RSS positions of a plurality of cells in the same NB, but configuring them in an interlace format in units of a subframe or multiples of a subframe.

Method 2-3 may be a pattern signaled in a form of a period and an offset, or may be configured in a form of a bitmap. In addition, the unit of the bitmap or the pattern may be a subframe or a multiple of a subframe, more precisely, it may be a pattern in units of a symbol, or in units of an MGL.

For example, when expressed as a bitmap in subframe units, cell 1 {1 0 0 1 0 0 1 0 0 . . . }, cell 2 {0 1 0 0 1 0 0 1 0 . . . }, cell 3 {0 0 1 0 0 1 0 0 1 . . . }, and so on, the RSS of cell 1 is configured in subframe #0, the RSS of cell 2 is configured in subframe #1, and the RSS of cell 3 is configured in subframe #2. If the RSS is interlaced in symbol units, the base station and/or the terminal may be configured in a form of puncturing the RSS sequence.

More generally, the RSS for measurement is limited so that it is not configured adjacent to each other between cells in consideration of the effect of interference on measurement performance, or in order to secure the RSS configuration interval (e.g., 1RB space b/w 2 adjacent RSSs), the PRB location (grid) in which the RSS can be configured may be limited.

(Method 3)

Method 3 is a method of configuring a zero-power RSS for noise and interference measurement.

The above-described methods mean information on resources in which the RSS is actually transmitted or the RSS can be transmitted in a neighbor cell.

This can be called a non-zero power RSS. The terminal may measure the RSRP or RSSI of a neighbor cell through the non-zero power RSS. If the base station intends to use the RSS configuration for measuring noise or interference of the neighbor cell, the base station may configure the zero-power RSS.

And, the terminal assumes that the RSS is not actually transmitted from the serving cell in the corresponding duration (however, in order to minimize the effect of the legacy terminal, it may be assumed that a specific broadcasting signal/channel such as CRS or PBCH, PSS, SSS or system information is transmitted from the serving cell). In addition, the UE can use the power measured in the corresponding duration (e.g., RSSI) as noise and/or interference power when measuring quality information such as RSRQ for the serving cell.

Fifth Embodiment: Signaling Overhead Reduction Method

In order to use a reference signal for re-synchronization (RSS) when measuring RSRP of a neighbor cell(s), for example, the following RSS-related parameters for each cell may be signaled through system information (SI).

ce-rss-periodicity-config: RSS periodicity {160, 320, 640, 1280} ms ce-rss-duration-config: RSS duration {8, 16, 32, 40} subframes ce-rss-freqPos-config: RSS frequency location (lowest physical resource block number)

ce-rss-timeOffset-config: RSS time offset in number of radio frames ce-rss-powerBoost-config: RSS power offset relative to LTE CRS {0, 3, 4.8, 6} dB If all of parameters related to signaling for the measurement are configured for each cell, a problem may arise in terms of signaling overhead.

In particular, the problem may be a frequency location and a time offset parameter To this end, the base station and/or the terminal arranges the RSS location of the neighbor cell adjacent to the RSS location of the serving cell (e.g., within the same NB), or limits the relative arrangement range relative to the RSS location of the serving cell, and It is possible to signal only the relative position (delta) value relative to the RSS position of the serving cell.

Hereinafter, a method of reducing signaling overhead for a time offset and a frequency position will be described in more detail.

In the present disclosure, S-cell and N-cell mean a serving cell and a neighbor cell, respectively.

(Method 1)

Method 1 relates to delta signaling for the RSS frequency location of a neighbor cell.

When signaling the RSS frequency location of the serving cell to the terminal in full resolution, 7 bits are required to represent e.g. {0, 1, 2, . . . , 98} PRBs.

If the number of neighbor cells is N, signaling bits of 7N are required. As a method of reducing the signaling overhead of the RSS frequency location of the neighbor cell, the base station may signal only the difference value (delta) to the terminal based on the RSS frequency location of the serving cell.

For example, assume that the RSS frequency location of the neighbor cell is limited to e.g., {0, +/−2, +/−4} PRBs based on the RSS location of the serving cell, and {0, +/−2, +/−4} PRBs, which are the difference from the serving cell, are delta.

In this case, when the base station signals the delta to the terminal, 3 bits are required for the delta value. Therefore, only 3N signaling bits are required to represent the RSS frequency location of the neighbor cell. N is a natural number.

Alternatively, if the delta signaling parameter does not exist in the RSS configuration for the neighbor cell, or if the corresponding field does not exist (hereinafter referred to as "no signaling case"), delta=0 may be set.

In this case, the RSS frequency location of the neighbor cell may be expressed by 2N signaling bits. Alternatively, the unit of delta signaling may be configured to a unit of X PRB (e.g., X=2 or larger) to avoid overlap or interference.

FIG. 11 is a diagram illustrating an example of a signaling method of an RSS frequency location of a neighbor cell without delta signaling proposed in the present disclosure.

FIG. 12 is a diagram illustrating an example of a signaling method of an RSS frequency location of a neighbor cell with delta signaling proposed in the present disclosure.

The candidate frequency locations of the RSS limited by the delta signaling may be limited to belong to one or a plurality of NBs for convenience of operation of the terminal or may be arranged regardless of the NB grid for deployment flexibility.

In the delta signaling, in order to effectively use the signaling bit, in the case of the no signaling case mentioned above, a specific value (e.g., the same value as serving cell RSS) may be assumed.

In addition, as mentioned above, when the RSS location is configured in consideration of the NB grid, the interpretation of the RSS location of the neighbor cell for the same signaling bit may vary according to the RSS location of the serving cell. For example, according to whether the RSS location of the serving cell is 0, 2, or 4 in the NB grid, the interpretation of the frequency location information for the neighbor cell RSS may be {2,4}, {0,4}, {0,2}, or {2,4}, {4,0}, {0,2}, respectively.

The former (when the interpretation of the frequency location information for the neighbor cell RSS is {2,4}, {0,4}, {0,2}) corresponds to Method 1 in FIG. 14 to be described later, and the latter (when the interpretation of the frequency location information for the neighbor cell RSS is {2,4}, {4,0}, {0,2}) may be the case of Method 2 of FIG. 14 to be described later.

When the number of neighbor cells to configure the RSS is large and/or when the RSS cannot be configured continuously, the RSS can be transmitted by configuring two or more RSS candidate frequency location blocks (the frequency region in which the RSS can be configured continuously or adjacently is referred to as 'block') of FIG. 12 as shown in FIG. 13.

In this case, the positions of blocks may be configured to carrier specific (or cell common) values in consideration of signaling overhead.

Which block belongs to one or a plurality of blocks configured to be carrier specific and the exact location within the block to which it belongs can be configured cell-specific for each neighbor cell.

FIG. 13 illustrates an example of a signaling method of an RSS frequency location of a neighbor cell with delta signaling proposed in the present disclosure.

The configuration of the block configured to be carrier-specific may be signaled in the form of a bitmap of a specific unit in the frequency domain when the block is continuous or a plurality of discontinuous blocks. The specific unit may be an RB, an NB composed of a plurality of adjacent RBs (e.g., 6 RBs), or a plurality of adjacent NBs, or a block unit (pre-fixed or configured).

In addition, the unit of the block may be an RB, a plurality of adjacent RBs, an NB, or a plurality of adjacent NBs. In the case of a block unit, the indication for a plurality of blocks may be defined in the form of a combinatorial index in which each possible combination for each block number is mapped as an integer.

Alternatively, the block(s) configured to be carrier specific may have a specific size on the frequency and may be arranged at specific intervals. Here, the arrangement of the block(s) on the frequency may be configured with parameters such as a starting point, a size, and an interval on the frequency. The size of block(s) may be in units such as RB(s), NB(s), and the starting point and the interval may be in units such as subcarrier(s) or RE(s), or RB(s), NB(s).

In this case, when there is an RB not included in the NB around the DC in the system BW (bandwidth) (for example, when system BW={3,5,15} MHz), the above parameters may be calculated excluding the corresponding RB.

The reason is, for the convenience of scheduling of the base station (for example, when the RB location in the NB is the same during frequency hopping), the RSS is located at a specific location on the NB by adjusting the start point and the interval of the block(s), but this is because, when there is an RB not included in the NB around the DC, the location of the RB in each NB may be changed in both NB(s) around the DC.

Alternatively, for similar reasons, the position(s) of RSS with the parameter(s) may be determined for only one area of the system BW, and symmetrically applied to RBs of the opposite area based on DC. The above methods may be applied to all when the number of blocks is one or more.

In addition, in a state in which a plurality of blocks are configured to be carrier specific, the exact location of the RSS may be signaled by, for example, three methods of FIG. 14. In FIG. 14, it is assumed that one block is composed of 1 NB (6 RBs) and the RSS is signaled in units of 2 RBs.

In this case, Method (1) and Method (2) of FIG. 14 assume that blocks are continuous (even if they are discontinuous), and are methods of sequentially signaling based on the RB index in the block.

Method (1) is a method of counting in the order of increasing RB index excluding RSS locations of the serving cell. In this case, the no signaling case assumes the same RSS location as the serving cell.

Method (2) is a method of signaling in the order of increasing RB index starting from the RSS location of the serving cell, and signaling an area with a smaller RB index value than the RSS position of the serving cell through a modulo operation when the RB index is exceeded.

Meanwhile, Method (3) of FIG. 14 is a method of determining a block with MSB (Most Significant Bit) (or LSB (Least Significant Bit))(s), and signaling the position in the block determined by the remaining LSB (or MSB)(s).

For each method of FIG. 14, an integer value expressed for each RSS position indicates a value when corresponding signaling bits are integerized.

For example, Method (3) uses 3 bits to divide a block into MSB 1 bit. In addition, when the RSS position in the block is indicated by LSB 2 bits, the RB index may be expressed in the order of increasing, such as {000}, {001}, {100}, (101), and {110}.

FIG. 14 illustrates an example of a signaling method of an RSS frequency location of a neighbor set having two blocks proposed in the present disclosure.

Considering that if the RSS partially or entirely overlaps in the frequency domain, synchronization performance or measurement performance may be deteriorated. 4, . . . , 98} PRBs), when configuring the RSS, for signaling overhead reduction, it may be configured in units of 2 RBs (that is, {0, 2, 4, . . . , 98} PRBs), multiples of 2 RBs, an NB, or the block.

Next, delta signaling of the neighbor cell RSS time offset will be described.

The RSS time offset of the neighbor cell may be signaled as a relative difference, that is, a delta value, with the time offset value of the serving cell. For example, the base station signals one of the {0, +/−1, +/−2} frames to the terminal.

In addition, the RSS time offset of the neighbor cell may be determined by adding a signaled value to the time offset value of the serving cell. Alternatively, if the corresponding field does not exist, the UE may assume that delta=0.

The unit of the delta may be a frame unit or an RSS duration unit for additionally reducing signaling overhead. The RSS duration may be, for example, one of {8, 16, 32, 40} subframes.

In addition, when the periods of the serving cell and the neighbor cell are different, the base station signals an offset based on the smaller of the two periods and interprets it to eliminate ambiguity.

The signaling overhead reduction by delta signaling is not limited to a frequency location and a time offset, and can be applied when the same RRC parameter is configured for the serving cell and the neighbor cell. For example, when the RSS power boosting parameter of the neighbor cell is also expected to have a small difference from the serving cell, similarly to the above method, the base station signals only the difference value, that is, delta, to the terminal, thereby reducing signaling overhead.

Alternatively, similarly to the above, the no signaling case may assume the same value as the serving cell.

In addition, in order to reduce signaling overhead, the RSS time offset value of the neighbor cell may be signaled with reduced resolution. For example, the RSS time offset value may be signaled is in units of X frame (e.g., fixed to 8 or 16 frame units) or in N(>1) times of the RSS time offset unit of the serving cell (that is, N, 2N or 4N frame unit according to the RSS period).

The delta signaling information may be implicit signaling. For example, the delta signaling information may be implicitly signaled by a (virtual) cell index. For example, it is possible to determine the location of the RSS within the NB through a cell index detected in a neighbor cell (and through an additional modulo operation, etc.).

The implicit signaling is not limited to the delta signaling information, and may be applied even when some or all of the information is transmitted.

In addition, the method(s) for reducing signaling overhead of all or part of the RSS configuration parameter(s) including the RSS time offset may be limited to a synchronous network (i.e., when synchronization between cells is guaranteed). In this case, the methods may be enabled/disabled by information on whether the network is synchronous or asynchronous.

Next, carrier specific signaling for a time offset and a frequency position of the RSS will be described.

In order to reduce signaling overhead, all or part of the RSS-related parameters can be configured only for the serving cell. In this case, the terminal assumes the same parameter value as the serving cell for the corresponding parameter (a method of limiting the RSS configuration flexibility), or when there is no corresponding parameter or partial information of the corresponding parameter is received, the terminal may perform Blind Decoding/Blind Detection (BD).

However, this method may have a disadvantage of increasing the power consumption of the terminal.

That is, when all or part of the RSS-related parameters are not in the neighbor cell, the UE may consider the same parameter as the serving cell. Alternatively, the terminal may perform BD (e.g., search within the NB to which the RSS of the serving cell belongs or within a specific window around the time location of the RSS of the serving cell) for missing information or partial information.

The network locates the frequency and/or time location of the RSS of the neighbor cell(s) to overlap with, or to be adjacent to, or around the RSS of the serving cell, and may not configure the corresponding frequency location and/or time offset parameter for the neighbor cell(s). Here, the case of transmitting or receiving a part of the parameter or partial information may include the following cases.

- The network (or base station) may signal a frequency location of the RSS of the neighbor cell in units of X PRBs, and the UE may perform BD in the X PRB for the frequency location value.
- The network (or the base station) may signal a time offset of the RSS of the neighbor cell in units of Y frames, and the UE may perform BD in the Y frame for the time offset value.

FIG. 15 is a flowchart illustrating an operation method of a terminal for performing measurement using an RSS proposed in the present disclosure.

That is, FIG. 15 shows an operation of a terminal for performing measurement using a Resynchronization Signal (RSS) in a wireless communication system.

First, the terminal receives power boosting information indicating a value relative to cell-specific reference signal (CRS) power and CRS port information indicating the number of antenna ports of the CRS from the first base station (S1510).

The number of antenna ports of the CRS may be 1, 2, or 4.

The antenna port of the RSS may be determined based on the antenna port of the CRS, and a more detailed process will be referred to the above description.

And, the terminal receives the RSS from the first base station (S1520).

In addition, the terminal performs Reference Signal Received Power (RSRP) and/or a Reference Signal Received Quality (RSRQ) measurement of the RSS based on the power boosting information and the CRS port information (S1530).

Additionally, the terminal may receive, from the first base station, control information on a location of time and/or frequency of RSS transmitted from the second base station.

Here, the control information may indicate a relative value to a location of time and/or frequency of the RSS transmitted from the first base station.

As mentioned in FIG. 15, the first base station may be a serving cell, and the second base station may be a neighbor cell.

FIG. 16 is a flowchart illustrating an operation method of a base station for performing measurement using an RSS proposed in the present disclosure.

That is, FIG. 16 shows an operation of a base station for performing measurement using a Resynchronization Signal (RSS) in a wireless communication system.

First, the base station transmits power boosting information indicating a value relative to cell-specific reference signal (CRS) power and CRS port information indicating the number of antenna ports of the CRS to the terminal (S1610).

The number of antenna ports of the CRS may be 1, 2, or 4.

The antenna port of the RSS may be determined based on the antenna port of the CRS, and a more detailed process will be referred to the above description.

And, the base station transmits the RSS to the terminal (S1620).

In addition, the base station receives a result (or report) of RSRP (Reference Signal Received Power) and/or RSRQ (Reference Signal Received Quality) measurement of the RSS from the terminal (S1630).

General Apparatus to which the Present Disclosure May be Applied

FIG. 17 illustrates a block diagram of a radio communication device to which methods suggested in the present disclosure may be applied.

In reference to FIG. 17, a radio communication system includes a base station 1710 and a plurality of terminals 1720 positioned in a region of a base station.

The base station and terminal may be represented as a radio device, respectively.

A base station 1710 includes a processor 1711, a memory 1712 and a radio frequency (RF) module 1713. A processor 1711 implements a function, a process and/or a method previously suggested in FIG. 1 to FIG. 16. Radio interface protocol layers may be implemented by a processor. A memory is connected to a processor to store a variety of information for operating a processor. A RF module is connected to a processor to transmit and/or receive a radio signal.

A terminal includes a processor 1721, a memory 1722 and a RF module 1723.

A processor implements a function, a process and/or a method previously suggested in FIG. 1 to FIG. 16. Radio interface protocol layers may be implemented by a processor. A memory is connected to a processor to store a variety of information for operating a processor. A RF module is connected to a processor to transmit and/or receive a radio signal.

Memories 1712 and 1722 may be inside or outside processors 1711 and 1721 and may be connected to a processor in a well-known various means.

In addition, a base station and/or a terminal may have one single antenna or multiple antenna.

Antennas 1714 and 1724 function to transmit and receive radio signals.

FIG. 18 is another example of a block diagram of a radio communication device to which methods suggested in the present disclosure may be applied.

In reference to FIG. 18, a radio communication system includes a base station 1810 and a plurality of terminals 1820 positioned in a region of a base station. A base station may be represented as a transmission device and a terminal may be represented as a reception device, and vice versa. A base station and a terminal include processors 1811 and 1821, memories 1814 and 1824, one or more Tx/Rx radio frequency (RF) modules 1815 and 1825, Tx processors 1812 and 1822, Rx processors 1813 and 1823 and antennas 1816 and 1826. A processor implements the above-described function, process and/or method. In more detail, an upper layer packet from a core network is provided for a processor 1811 in a DL (a communication from a base station to a terminal). A processor implements a function of a L2 layer. In a DL, a processor provides radio resource allocation and multiplexing between a logical channel and a transmission channel for a terminal 1820 and takes charge of signaling to a terminal. A transmission (TX) processor 1812 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 1816 in each Tx/Rx module (or a transmitter-receiver 1815). Each Tx/Rx module may modulate a RF carrier in each spatial stream for transmission. In a terminal, each Tx/Rx module (or a transmitter-receiver 1825) receives a signal through each antenna 1826 of each Tx/Rx module. Each Tx/Rx module reconstructs information modulated by a RF carrier to provide it for a reception (RX) processor 1823. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 1821.

An UL (a communication from a terminal to a base station) is processed in a base station 1810 by a method similar to that described in a terminal 1820 in relation to a function of a receiver. Each Tx/Rx module 1825 receives a signal through each antenna 1826. Each Tx/Rx module provides a RF carrier and information for a RX processor 1823. A processor 1821 may be related to a memory 1824 which stores a program code and data. A memory may be referred to as a computer readable medium.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The present disclosure has been described mainly with the example applied to 3GPP LTE/LTE-A, 5G system, but may also be applied to various wireless communication systems except the 3GPP LTE/LTE-A, 5G system.

What is claimed is:

1. A method of performing measurement using a Resynchronization Signal (RSS) in a wireless communication system, the method performed by a terminal comprising:

receiving configuration information for specifying an RSS configuration from a first base station, wherein the configuration information includes RSS period information, RSS duration information, RSS frequency location information, RSS time offset information and power boosting information representing a value relative to cell-specific reference signal (CRS) power;

receiving the RSS from the first base station; and performing Reference Signal Received Power (RSRP) measurement of the RSS based on the configuration information, wherein an RSS time offset is determined in units of one or more radio frames based on the RSS time offset information.

2. The method of claim 1, wherein the configuration information further includes CRS port information representing a number of antenna ports of a CRS.

3. The method of claim 2, wherein an antenna port of the RSS is determined based on the antenna port of the CRS.

4. The method of claim 2, further comprising, receiving, from the first base station, control information on a location of time and/or frequency of RSS transmitted from a second base station.

5. The method of claim 4, wherein the control information represents a relative value to a location of time and/or frequency of the RSS transmitted from the first base station.

6. The method of claim 4, wherein the first base station is a serving cell, and the second base station is a neighbor cell.

7. The method of claim 1, wherein the RSS frequency location information includes a lowest physical resource block number of the RSS.

8. The method of claim 1, wherein the RSS period information includes one of 160 ms, 320 ms, 640 ms or 1280 ms.

9. The method of claim 1, wherein the RSS duration information includes one of 8 subframes, 16 subframes, 32 subframes or 40 subframes.

10. The method of claim 1, wherein the power boosting information includes one of 0 dB, 3 dB, 4.8 dB or 6 dB.

11. The method of claim 1, wherein an RSS time offset of a specific cell is determined based on an RSS time offset of a serving cell and a cell identifier of the specific cell.

12. A terminal for performing measurement using a Resynchronization Signal (RSS) in a wireless communication system, the terminal comprising:

a transmitter for transmitting a radio signal;

a receiver for receiving a radio signal; and a processor for controlling the transmitter and the receiver, wherein the processor controls to:

receive configuration information for specifying an RSS configuration from a first base station, wherein the configuration information includes RSS period information, RSS duration information, RSS frequency location information, RSS time offset information and power boosting information representing a value relative to cell-specific reference signal (CRS) power;

receive the RSS from the first base station; and perform Reference Signal Received Power (RSRP) measurement of the RSS based on the configuration information, wherein an RSS time offset is determined in units of one or more radio frames based on the RSS time offset information.

13. The terminal of claim 12, wherein the configuration information further includes CRS port information representing a number of antenna ports of a CRS.

14. The terminal of claim 13, wherein an antenna port of the RSS is determined based on the antenna port of the CRS.

15. The terminal of claim 13, further comprising, receiving, from the first base station, control information on a location of time and/or frequency of RSS transmitted from a second base station.

16. The terminal of claim 15, wherein the control information represents a relative value to a location of time and/or frequency of the RSS transmitted from the first base station.

17. The terminal of claim 15, wherein the first base station is a serving cell, and the second base station is a neighbor cell.

18. The terminal of claim 12, wherein the RSS frequency location information includes a lowest physical resource block number of the RSS.

19. A base station for transmitting a Resynchronization Signal (RSS) in a wireless communication system, the base station comprising:

a transmitter for transmitting a radio signal;

a receiver for receiving a radio signal; and a processor for controlling the transmitter and the receiver, wherein the processor controls to:

transmit configuration information for specifying an RSS configuration to a terminal, wherein the configuration information includes RSS period information, RSS duration information, RSS frequency location information, RSS time offset information and power boosting information representing a value relative to cell-specific reference signal (CRS) power; and transmit the RSS to the terminal;

wherein an RSS time offset is determined in units of one or more radio frames based on the RSS time offset information.

20. The base station of claim 19, wherein the RSS frequency location information includes a lowest physical resource block number of the RSS.

* * * * *